(12) United States Patent
Kariya et al.

(10) Patent No.: US 8,460,586 B2
(45) Date of Patent: Jun. 11, 2013

(54) INJECTION MOLDING METHOD AND APPARATUS FOR CONTROLLING A MOLD TEMPERATURE AND DISPLACEMENT OF AN INJECTION SCREW

(75) Inventors: Toshihiko Kariya, Nagoya (JP); Michitaka Hattori, Nagoya (JP); Shigeru Nozaki, Nagoya (JP); Satoshi Imaeda, Nagoya (JP)

(73) Assignee: Mitsubishi Heavy Industries Plastics Technology Co., Ltd., Nagoya-shi, Aichi (JP)

( * ) Notice: Subject to any disclaimer, the term of this patent is extended or adjusted under 35 U.S.C. 154(b) by 51 days.

(21) Appl. No.: 13/122,505

(22) PCT Filed: Apr. 15, 2009

(86) PCT No.: PCT/JP2009/057613
§ 371 (c)(1),
(2), (4) Date: Apr. 4, 2011

(87) PCT Pub. No.: WO2010/041483
PCT Pub. Date: Apr. 15, 2010

(65) Prior Publication Data
US 2011/0210461 A1    Sep. 1, 2011

(30) Foreign Application Priority Data
Oct. 9, 2008  (JP) .................................. 2008-262573

(51) Int. Cl.
*B29C 45/78* (2006.01)
(52) U.S. Cl.
USPC ......... 264/40.5; 264/40.6; 425/143; 425/144; 425/145; 425/150
(58) Field of Classification Search
USPC ......... 425/143, 144, 145, 149, 150; 264/40.5, 264/40.6
See application file for complete search history.

(56) References Cited

U.S. PATENT DOCUMENTS

| 4,988,273 A | * | 1/1991 | Faig et al. | .................. 425/145 |
| 5,362,222 A | * | 11/1994 | Faig et al. | .................. 425/145 |
| 2005/0179157 A1 | | 8/2005 | Muranaka et al. | |

FOREIGN PATENT DOCUMENTS

| CN | 1654185 A | 8/2005 |
| JP | 64-004896 B2 | 9/1984 |

(Continued)

OTHER PUBLICATIONS

International Search Report of PCT/JP2009/057613, date of mailing May 19, 2009.

(Continued)

*Primary Examiner* — Tim Heitbrink
(74) *Attorney, Agent, or Firm* — Westerman, Hattori, Daniels & Adrian, LLP

(57) ABSTRACT

An injection molding device is provided with a mold, an injection unit equipped with an injection screw that is displaceably configured such that a molten resin is filled into a cavity by forward movement to perform plural injection operations including at least a filling operation and a pressure keeping operation by displacing the injection screw, a position sensor for detecting the position of the injection screw, a temperature sensor capable of measuring the temperature of the vicinity of the cavity of the mold, a temperature adjustment unit capable of adjusting the temperature of the mold by heating or cooling the mold, a control unit for controlling the displacement of the injection screw and the temperature of the mold and determining plural switching timings of the injection operations on the basis of the position of the screw, and a display unit for displaying an image. The control unit creates a temperature waveform of the vicinity of the cavity based on an input from the temperature sensor and displays a first correlation diagram showing the correlation between the temperature waveform and a predetermined variation corresponding to the change of the temperature waveform and showing at least part of the determined plural switching timings of the injection operations on the display unit.

18 Claims, 16 Drawing Sheets

FOREIGN PATENT DOCUMENTS

| | | |
|---|---|---|
| JP | 60-141953 U | 9/1985 |
| JP | 61-89820 A | 5/1986 |
| JP | 62-261419 A | 11/1987 |
| JP | 62-294525 A | 12/1987 |
| JP | 63-114619 A | 5/1988 |
| JP | 63-236616 A | 10/1988 |
| JP | 64-004896 B2 | 1/1989 |
| JP | 03-132325 A | 6/1991 |
| JP | 3-219936 A | 9/1991 |
| JP | 04-082722 A | 3/1992 |
| JP | 04-070111 B2 | 11/1992 |
| JP | 06-031787 A | 2/1994 |
| JP | 08-216215 A | 8/1996 |
| JP | 10-272663 A | 10/1998 |
| JP | 2000-052396 A | 2/2000 |
| JP | 2001-205656 A | 7/2001 |
| JP | 2001-293761 A | 10/2001 |
| JP | 2004-276288 A | 10/2004 |
| JP | 2004-314494 A | 11/2004 |
| JP | 2005-329577 A | 12/2005 |
| JP | 2006-110905 A | 4/2006 |
| JP | 2007-83502 A | 4/2007 |
| JP | 2008-055698 A | 3/2008 |
| JP | 4127339 B2 | 7/2008 |
| WO | 2007/034815 A1 | 3/2007 |

OTHER PUBLICATIONS

Written Opinion of the International Searching Authority issued on the related PCT/JP2009/057613, date of mailing May 19, 2009.

Japanese Office Action dated Feb. 7, 2012, issued in corresponding Japanese Patent Application No. 2009-099202.

Chinese Office Action dated Mar. 28, 2013, issued in corresponding Chinese Patent Application No. 2009801391921, w/ English translation.

* cited by examiner

A: BEGINNING OF INJECTION
B: CHANGE IN SPEED
C: BEGINNING OF PRESSURE KEEPING
D: COMPLETING OF PRESSURE KEEPING

A: BEGINNING OF INJECTION
B: CHANGE IN SPEED
C: BEGINNING OF PRESSURE KEEPING
D: COMPLETING OF PRESSURE KEEPING

A: BEGINNING OF INJECTION
B: CHANGE IN SPEED
C: BEGINNING OF PRESSURE KEEPING
D: COMPLETING OF PRESSURE KEEPING

FIG. 13
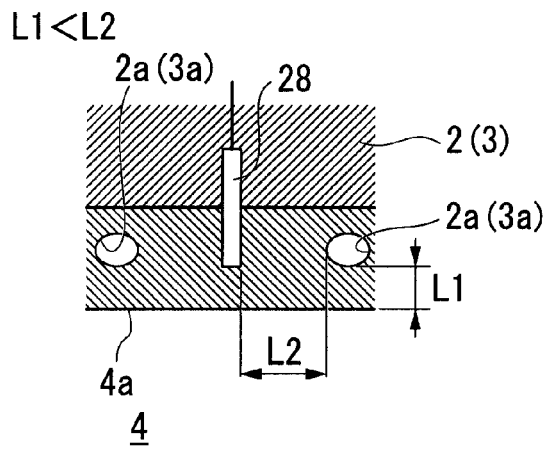
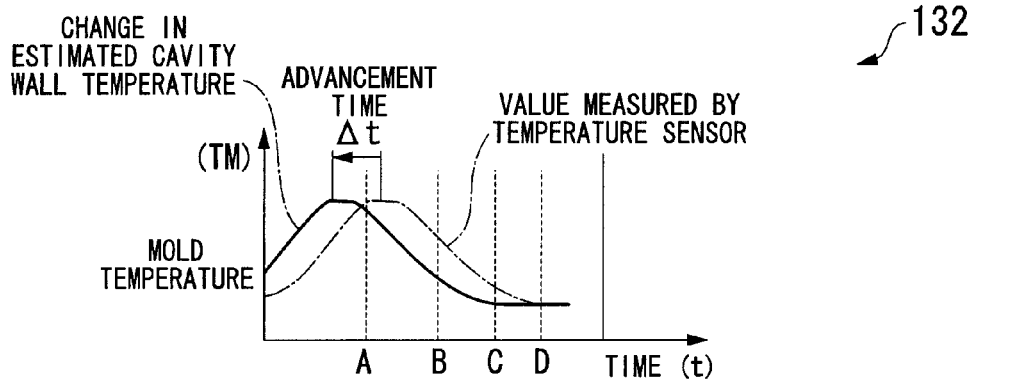
A: BEGINNING OF FILLING
B: CHANGE IN SPEED
C: BEGINNING OF PRESSURE KEEPING
D: COMPLETING OF PRESSURE KEEPING

INJECTION MOLDING METHOD AND APPARATUS FOR CONTROLLING A MOLD TEMPERATURE AND DISPLACEMENT OF AN INJECTION SCREW

TECHNICAL FIELD

The present invention relates to an injection molding device and an injection molding method providing favorable fluidity of molten resin within a mold by heating the mold before an injection of the molten resin.

BACKGROUND ART

In general, a molding cycle in an injection molding includes a mold clamping process of combining separated molds to form a cavity, a filling process of filling a molten resin by using an injection section having a screw, a pressure-keeping process, a cooling process of cooling the molten resin, a mold unclamping process of separating the molds, and a molded-item take-out process. Of these molding processes, the filling, pressure keeping, and cooling operations performed by the injection section (injection operation) have effects on quality of the molded item or productivity. Therefore, for the injection molding device that automatically performs the molding processes as described above, it is important how to decide control conditions such as the amount of the control and the control timing of the injection operations.

For example, an injection molding device shown in Patent Literature 1 includes an injection unit that fills a molten resin in a cavity, and a mold internal pressure sensor that detects the pressure in the cavity. From the beginning of filling the resin until the mold internal pressure reaches a predetermined value, the injection pressure of the injection unit is controlled in such a manner that a forward movement velocity of an injection screw correspond to a predetermined velocity waveform pattern (normal filling process). After the mold internal pressure reaches the predetermined value, the injection pressure of the injection unit is controlled in such a manner that the mold internal pressure correspond to the predetermined pressure waveform pattern (mold internal pressure control process). With these controls, the molten resin is injected at a high speed, and the mold internal pressure is totally decreased while evenly keeping a pressure distribution in the cavity to prevent the occurrence of a weld mark or warping in the molded item.

Additionally, an injection molding device shown in Patent Literature 2 employs a heating-cooling molding, which is a type of injection molding methods. That is, this injection molding device has a temperature adjustment unit that adjusts the temperature of a mold. The injection molding device coordinates control of molding processes and control of a mold temperature in such a manner that a mold temperature adjustment process is performed in accordance with the progress of the molding process.

Patent Literature 1: Japanese Patent No. 4127339 (FIG. 6)
Patent Literature 2: Japanese Unexamined Patent Application, First Publication No. 2006-110905

DISCLOSURE OF THE INVENTION

Technical Problem

Incidentally, the injection molding devices in the conventional examples have a problem that significant trial and error or skills of a designer are required for optimizing the cooperation between the adjustment of the mold temperature and the molding processes. In other words, for example, the factor of the rise in the mold temperature includes heating by the temperature adjustment unit, heating by the molten resin, and shear heat of the resin at the time of high speed filling. However, since the relativity between the temperature-rising factor and the mold temperature cannot be clearly obtained, the control conditions such as the respective control amounts and the control timings need to be decided based on trial and error.

This kind of issue regarding optimization is important in terms of improving the quality of the molded items and improving the productivity in manufacture thereof.

The present invention has been made in view of the circumstances as described above, and one object of the present invention is to provide an injection molding device and an injection molding method that can contribute to determining optimum control conditions.

Further, another object of the present invention is to provide an injection molding device and an injection molding method that can improve both the quality and productivity of molded items.

Technical Solution

Regarding the problem describes above, the present invention solves the problem using the following means.

That is, an injection molding device according to the present invention includes: a mold having a cavity; an injection section, that has an injection screw displaceably configured to fill a molten resin into the cavity by the forward movement, and that performs a plurality of injection operations including at least a filling operation and a pressure keeping operation by displacing the injection screw; a position sensor that detects a screw position which is a position of the injection screw; a temperature sensor that can measure a temperature in the vicinity of the cavity of the mold; a temperature adjustment section that can adjust a mold temperature by heating or cooling the mold; a control section that controls a displacement of the injection screw and the mold temperature, and determines a plurality of switching timings of the injection operations on the basis of the screw position; and a display unit that displays an image on the basis of a command from the control section; wherein the control section creates a waveform of the temperature in the vicinity of the cavity on the basis of input from the temperature sensor, and has the display unit display a first correlation diagram showing a correlation between the waveform of the temperature and a predetermined variation, which corresponds to a transition of the waveform of the temperature, and at least a part of the determined plurality of switching timings of the injection operations.

Note that the term "injection molding device" of the present invention not only includes an injection molding unit and a mold, but also includes peripheral units such as a mold temperature adjustment device connectable to the injection molding unit or to the mold.

Additionally, the term "injection operations" represents operations of the injection section during the molding processes including mold-clamping, filling, pressure-keeping, mold-unclamping and taking-out steps.

Additionally, the term "screw" means to include an injection screw and an injection plunger.

Additionally, an injection molding method according to the present invention is characterized in performing evaluation or selection of a molding condition by using the injection molding device described above.

Advantageous Effects

According to the injection molding device relates to the present invention, the first correlation diagram showing the correlation between the waveform of the temperature and the predetermined variation, which corresponds to the transition of the waveform of the temperature, and at least a part of the determined plurality of switching timings of the injection operations. Therefore, a relationship between the mold temperature and the injection operations can be visually recognized in a clear manner. This makes inspection of various factors concerning the transition of the mold temperature easy. Therefore, it is possible to accurately evaluate adequacy of the selection of the switching timings of the injection operations, the control conditions for the injection operations, and the control conditions for the mold temperature (switching timings of the heating medium and the cooling medium in a case where a thermal medium is used for the heating and the cooling). This contributes to the determining of optimum control conditions.

Additionally, according to the injection molding method of the present invention, since the evaluation or selection of the molding conditions is made by using the injection molding device described above, it is possible to improve the stability of the injection molding as well as the quality of the molded item.

BRIEF DESCRIPTION OF DRAWINGS

FIG. 13 relates to a ninth embodiment of the present invention, and is a diagram showing a schematic configuration in the vicinity of a mold temperature sensor, where FIG. 13 (A) is a sectional view in which a main portion is enlarged, and FIG. 13 (B) is a diagram showing a first correlation diagram 132 in which the mold temperature TM is corrected by a predetermined value.

BEST MODE FOR CARRYING OUT THE INVENTION

Hereinbelow, embodiments according to the present invention will be described with reference to the drawings.
(First Embodiment)

Figure 1:
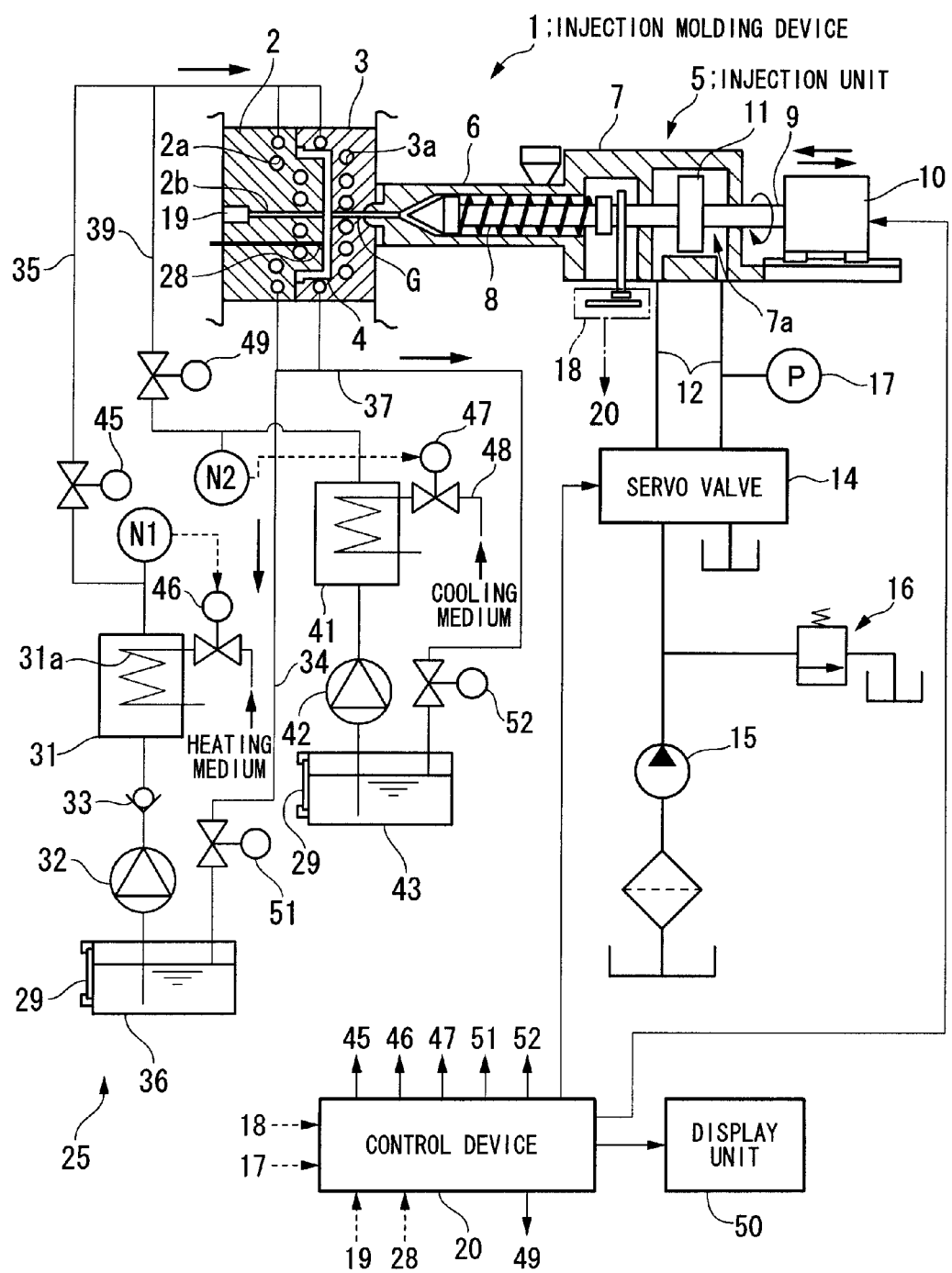
FIG. 1 relates to a first embodiment of the present invention, and is a schematic diagram of a mold heating-cooling control circuit and an injection molding device that has a hydraulic injection unit and that can perform a molding method which relates to an embodiment of the present invention.
Figure 2:
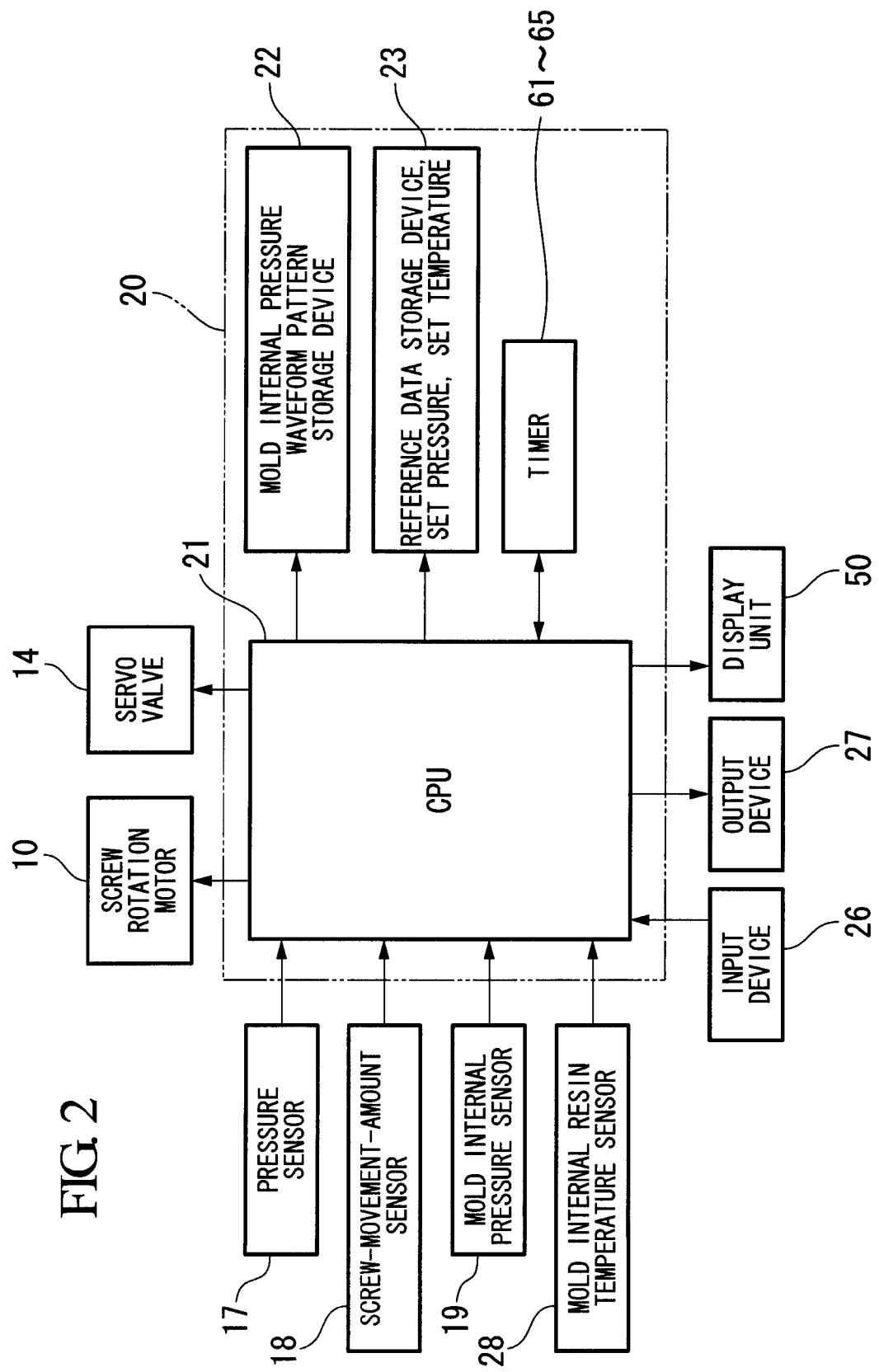
FIG. 2 relates to a first embodiment of the present invention, and is a block diagram showing control elements of a mold-temperature and mold internal pressure controlling device provided to the mold heating-cooling control circuit shown in FIG. 1.
Figure 3:
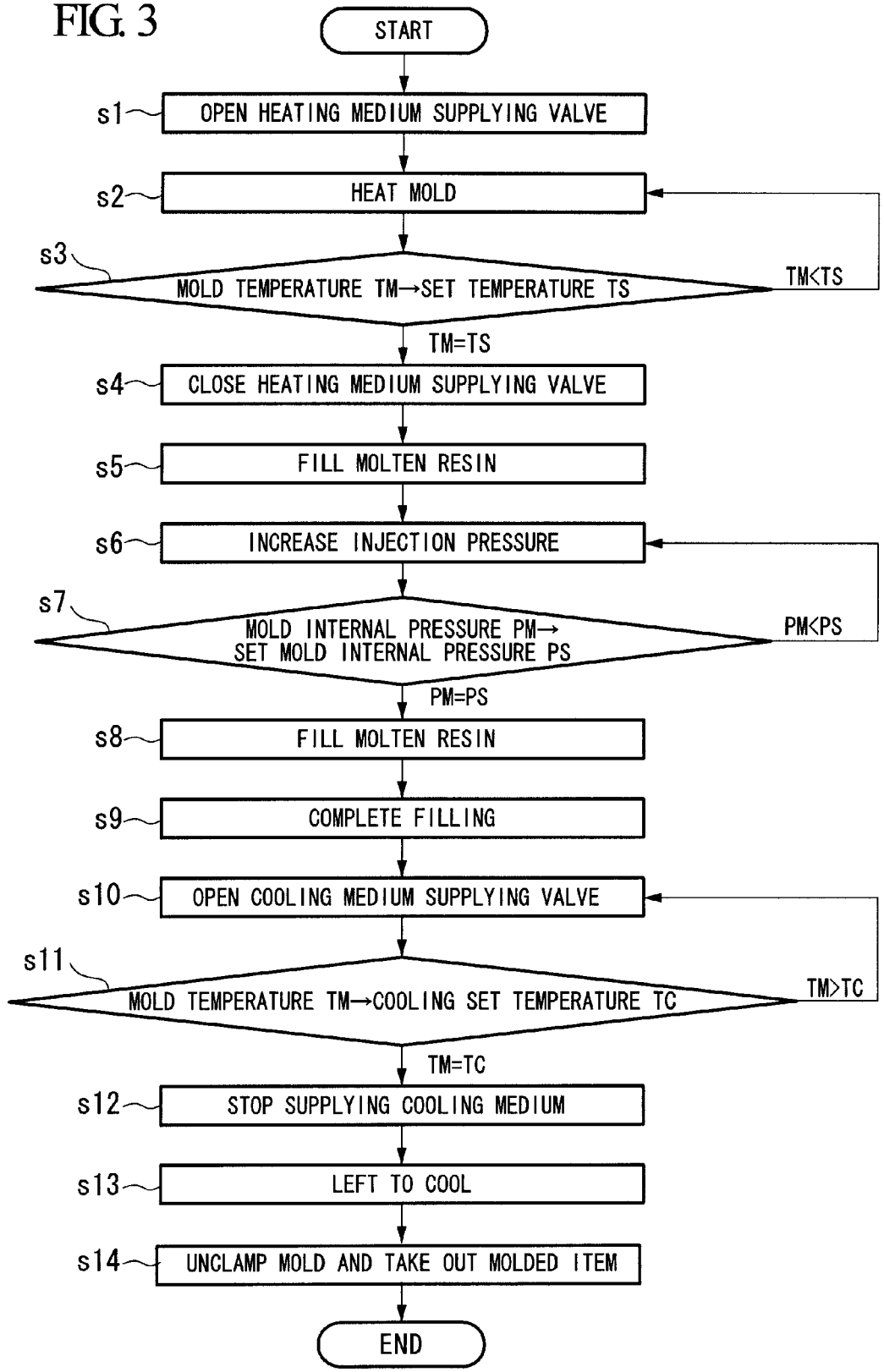
FIG. 3 relates to a first embodiment of the present invention, and is a process chart of an injection molding employing the mold heating-cooling control circuit shown in FIG. 1.

FIG. 1 is a schematic diagram of a mold heating-cooling control circuit and an injection molding device that has a hydraulic injection unit, and that can implement a molding method according to a first embodiment of the present invention. FIG. 2 is a block diagram showing control elements of a mold-temperature and mold internal pressure controlling device provided to the mold heating-cooling control circuit shown in FIG. 1. FIG. 3 is a process chart of an injection molding employing the mold heating-cooling control circuit shown in FIG. 1. Note that the mold shown in the figure is in a state where a cavity has been formed.

In FIG. 1, an injection molding device 1 has a movable mold 2 and a fixed mold 3 for obtaining a molded item in a desired shape. The movable mold 2 is fixed to a movable base (not shown) of a mold clamping device, and the fixed mold 3 is fixed to a fixed base (not shown) of the mold clamping device. When a resin product is manufactured by using the injection molding device 1, a clamping cylinder, which is not shown, is actuated to clamp the movable mold 2 and the fixed mold 3. This enables forming of a cavity 4 with the movable mold 2 and the fixed mold 3.

Note that, the term "mold 2 and 3" as used herein indicates both the movable mold 2 and the fixed mold 3.

As shown in FIG. 1, the fixed mold 3 is connected with an injection cylinder (heating cylinder) 6 included in a so-called inline screw type injection unit (injection section) 5. The cavity 4 formed by the molds 2 and 3 is configured such that a molten resin can be injected (filled) thereinto from the injection unit 5 through a gate G. The injection cylinder 6 extends out from a unit body 7, and an injection screw 8 is provided within the injection cylinder 6. The injection screw 8 is connected to a connection shaft 9, and the connection shaft 9 is connected to a rotation shaft of a screw rotation motor 10 provided at a side (right side in the figure) of the unit body 7. The screw rotation motor 10 is attached to the unit body 7 in a slidable manner.

Additionally, a piston 11 is fixed to the connection shaft 9, and is located within a cylinder 7a. A supply side and a return side of the cylinder 7a are connected through a hydraulic pipe 12 to a servo valve 14 and a hydraulic pump 15, respectively. With this connection, when an operating oil is supplied from the hydraulic pump 15 through the servo valve 14 and the hydraulic pipe 12 to the cylinder 7a, the injection screw 8 can be made forward movement and backward movement by the piston 11.

With the configuration as described above, the piston 11 and the cylinder 7a function as a hydraulic cylinder for injection, whereby the injection screw 8 is made displaceable. Note that a relief valve 16 is disposed between the servo valve 14 and the hydraulic pump 15.

The hydraulic pipe 12 has a pressure sensor 17 that detects a hydraulic pressure for injection. A hydraulic pressure detected by the pressure sensor 17 is in proportion to an injection pressure Ph, which represents a forward movement pressure of the injection screw 8 in the injection cylinder 6.

Additionally, the injection unit 5 is provided with a screw-movement-amount sensor (position sensor) 18 that detects a movement amount of the injection screw 8. The screw-movement-amount sensor 18 detects the amount of movement of the injection screw 8 from an original position through a detection target fixed to the connection shaft 9, in an electrical, magnetic or optical manner.

Additionally, the movable mold 2 is provided with a mold internal pressure sensor 19 that detects a mold internal pressure PM of a molten resin in the cavity 4 in the vicinity of the gate G. That is, the movable mold 2 has a fluid passage 2b, at one end of which communicates with the cavity 4, and the mold internal pressure sensor 19 detects a pressure of the molten resin flowing into the fluid passage 2b from the vicinity of the gate G as the mold internal pressure PM. Additionally, the movable mold 2 is provided with a mold internal resin temperature sensor (temperature sensor) 28 that detects a mold temperature TM in the vicinity of the cavity 4. Note that each item 2a, 3a represents a thermal-medium fluid passage.

The control of the injection unit 5 as described above is performed by a control device (control section) 20. As shown in FIG. 2, the control device 20 includes an input device 26, an output device 27, a mold internal pressure waveform pattern storage device 22, reference data storage devise 23 for a set pressure, a set temperature and the like, each timers 61 to 65, and a CPU 21. The CPU 21 has a memory circuit that stores a program for control and calculation processing, and various data for the control and calculation. The CPU 21 is connected to the screw rotation motor 10 and the servo valve 14 in the injection unit 5 through an electric power line, and a signal line, respectively, and controls both sections in accordance with a prescribed program. In the same manner, the CPU 21 is connected to the pressure sensor 17, the screw-movement-amount sensor 18, the mold internal pressure sensor 19, and the mold internal resin temperature sensor 28 through respective signal lines. Each of the sensors 17 to 19 and 28 provides the CPU 21 with a signal representing a detected value.

Next, with reference to a schematic diagram of a mold heating-cooling control circuit in FIG. 1, a configuration of heating devise and cooling devise for the molds 2 and 3 will be described. As means for heating the molds 2 and 3, a steam generator (steam generating devise) 31 is employed, and as means for cooling the molds 2 and 3, a cooling device (cooling water generating devise) 41 is employed. The steam generator 31 and the cooling device 41 constitute a temperature adjustment unit 25 that can adjust a mold temperature TM of the molds 2 and 3.

The steam generator 31 is configured such that a heating water stored in a storage tank 36 is pumped up by a high-pressure pump 32, and the heating water is pressed into a pressure container, which is a main body of the steam generator 31, and the heating water is heated to generate steam (heating medium). The storage tank 36 is a tank for supplying and recovering the heating water. Reference numeral 29 is a liquid surface level gauge, and when the liquid level is lowered more than a set height range, water is fed by opening a not-shown switching valve connected to a water source. Additionally, although the present embodiment gives an example of recovering the heating steam to the storage tank 36, the steam may be discharged to the atmospheric air without being recovered.

In FIG. 1, the steam generator 31 is shown as a device that generates steam by exchanging heat with a heating medium. However, in general, a boiler is often used as the steam generator 31. The steam generated in the steam generator 31 is supplied to the molds 2 and 3 by switching a switching valve 45 connected with a feeding pipe 35. N1 is a steam-temperature detection sensor for the steam. The control device 20 compares the steam temperature detected by the steam-temperature detection sensor N1 with a steam set temperature stored in the control device 20, and controls the steam temperature to be the set temperature by opening or closing the switching valve 46 to make the heating medium pass through a heater 31a.

Additionally, in FIG. 1, the heater 31a in the steam generator 31 may be a heating device such as an electric resistance heater, an induction heating heater that employs high-frequency electric current, and a heat pump that employs adiabatic compression of an inert gas.

The cooling device 41 pumps up a cooling water (cooling medium) stored in a cooling water tank 43, and the cooling water is pressed into the cooling device 41. The temperature of the cooling water to be set to a low temperature such that not to exceed a temperature that makes a temperature of the molded item filled in the cavity 4 of the mold to be less than or equal to a solidifying temperature of a material of the molded item.

A cooling water pipe 39 is provided with a switching valve 49 and a cooling-water-temperature detection sensor N2. A switching valve 47 provided to a cooling medium pipe 48 is opened or closed to allow the cooling medium to pass through the cooling device 41, whereby the cooling water is controlled so as to be a set temperature. Additionally, in the present embodiment, although the cooling device for the cooling water being adjusted to the predetermined temperature is provided on the supply side of the cooling water, a cooling device such as a cooling tower may be provided instead, and the cooling water may be used without adjusting the temperature to be the predetermined temperature. Reference numerals 34 and 37 represent a discharge pipe, and reference numerals 51 and 52 represent a switching valve.

The control device 20 includes: the timer 61 for setting a timing of switching the steam to stop the supply of the steam which is used for controlling rapid heating and temperature riding of the mold; the timer 62 for setting a timing of stopping the supply of the cooling water; the timer 63 for delaying start of the cooling water supply from the stop of the steam supply; the timer 64 for delaying start of the steam supply from the stop of the cooling water supply; and the timer 65 which is used when detecting a injection speed v by temporal differentiation of the amount of displacement of the injection screw 8, where the displacement is based on the detected value of the screw-movement-amount sensor 18 as described above. Note that it may be possible to employ a configuration in which the injection speed v is obtained from the rotation number of a motor that drives the injection screw 8.

The control device 20 determines switching timings of injection operations of the injection unit 5 by using the screw-movement-amount sensor 18. That is, a screw position St of the injection screw 8 is pre-stored for each predetermined injection operation, and each of the injection operations of the injection unit 5 is determined on the basis of the stored screw position St and the detected value of the screw-movement-amount sensor 18 (see FIG. 4). The switching timings include a filling beginning time A and an injection speed switching (changing) time B at the time of filling operation of the injection unit 5; and a pressure-keeping beginning time C and a pressure-keeping ending time D at the time of pressure keeping operation. Note that, although the cooling of the molds 2 and 3 begins at the pressure-keeping ending time D in FIG. 4, it may be possible to begin the cooling at any timing in the injection process and the pressure keeping process.

The control device 20 controls the switching valves 45, 46, 47, 49, 51 and 52 on the basis of the above described timers 61 to 64, and supplies the steam and cooling water so as to raise or lower a temperature to the temperature set for the molds 2 and 3. This switching of the supply is recognized by the control device 20 as a mold heating process and a mold cooling process.

The control device 20 have an image display unit 50 displaying a first correlation diagram 81 that shows a correlation between a temperature waveform F1 based on input from the mold internal resin temperature sensor 28 and time t corresponding to a transition of the temperature waveform F1, as well as plural switching timings (beginning of filling A to completing of pressure keeping D) determined as described above (see FIG. 4).

Figure 4:
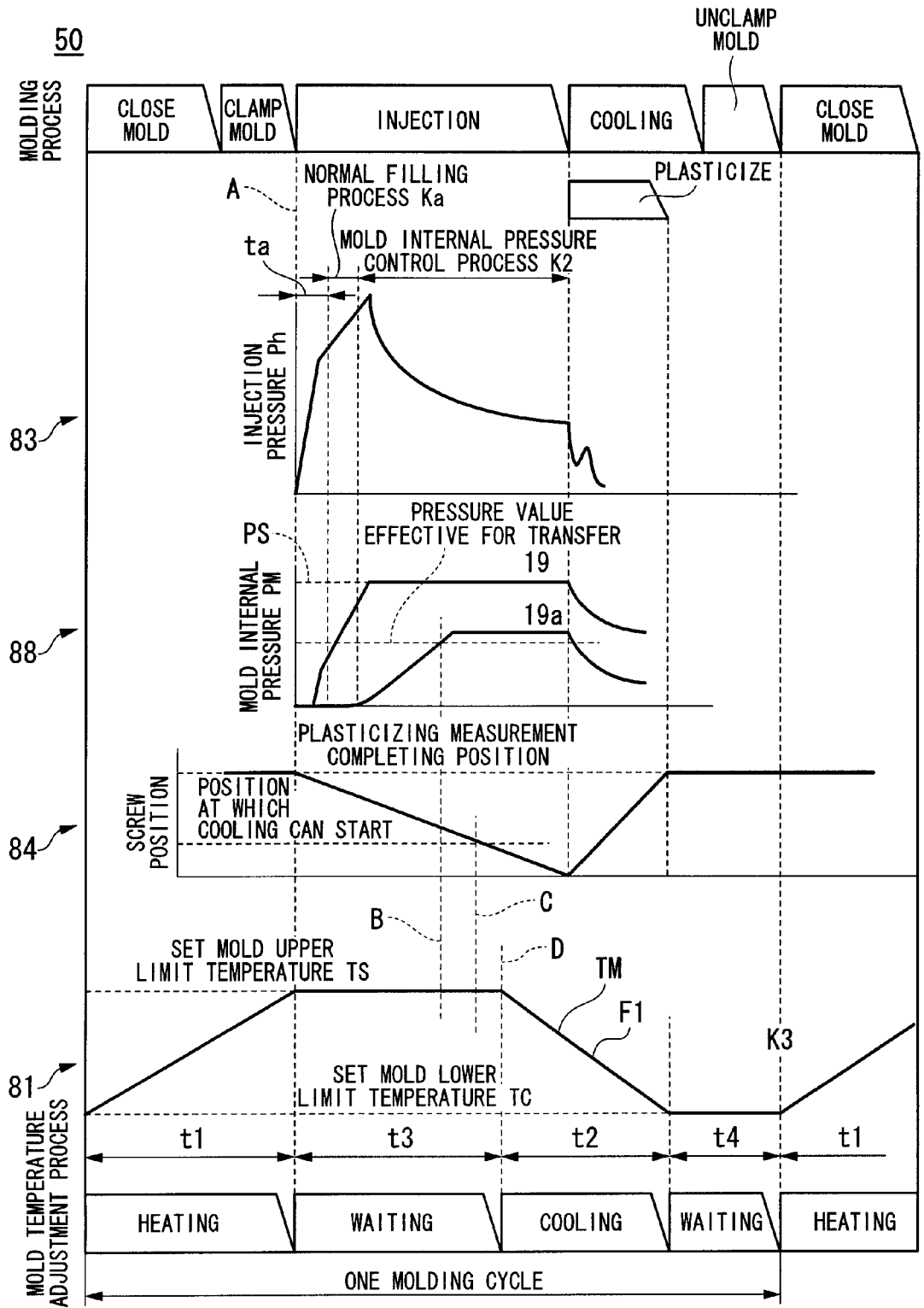
FIG. 4 relates to a first embodiment of the present invention, and is one example showing a mold temperature, an injection pressure and a mold internal pressure during injection of a molding cycle in a same timescale.

Additionally, the control device 20 creates a third correlation diagram 83 between the injection pressure Ph that is a value measured by the pressure sensor 17 and time t corresponding to a transition of the measured value of the injection pressure Ph in the same timescale as the first correlation diagram 81, and disposes and displays the third correlation diagram 83 on the image display unit 50 so as to be able to be compared with the first correlation diagram 81 (see FIG. 4).

Further, the control device 20 creates a fourth correlation diagram 84 between a measured value of the screw position St and time t corresponding to a transition of the measured value of the screw position St in the same timescale as the first correlation diagram 81, disposes and displays the fourth correlation diagram 84 on the image display unit 50 so as to be able to be compared with the first correlation diagram 81 (see FIG. 4).

Note that the control device 20 may create an eighth correlation diagram 88 between a measured value of the mold internal pressure PM and time t corresponding to a transition of the measured value of the mold internal pressure PM in the same timescale as the first correlation diagram 81, and may dispose and display the eighth correlation diagram 88 on the image display unit 50 so as to be able to be compared with the first correlation diagram 81 (see FIG. 4).

Note that a configuration of the image display unit 50 includes a case where one display unit is formed of a plurality of screens, in addition to a case where one display unit is formed by one single screen.

Next, a example of an injection molding method for manufacturing a resin product using the injection molding device 1 will be described in accordance with a process diagram of FIG. 3 showing a molding procedure (s1 to s14) in FIG. 3. First, a mold clamping device which is not shown in the figure is activated to clamp the molds 2 and 3 to form the cavity 4 (clamping process). Additionally, a predetermined resin material is supplied to the inside of the injection cylinder 6.

s1: open the switching valve 45, which is a steam supplying valve, and feed steam to the molds 2 and 3.

s2: heat the molds.

s3: compare the mold temperature TM with a high-temperature-side set temperature (set mold upper limit temperature) TS of the molds, and continue the heating of the mold if TM<TS, and proceed to next step s4 if TM=TS. (In general, the high-temperature-side set temperature TS of the molds to be set at the temperature higher than or equal to a heat-deformation temperature or a glass transition temperature of the resin filled in the mold cavity.)

s4: close the switching valve 45, which is the steam supplying valve, and stop the supply of the steam.

s5: feed an operating oil to the cylinder 7a to move the injection screw 8 forward, and inject and fill the molten resin to the cavity 4 while mainly controlling the injection process by speed control.

s6: raise the hydraulic pressure of the fed operation oil, and proceed to a mold internal pressure control process.

s7: compare the mold internal pressure (pressure of the resin in the cavity) PM with the set mold internal pressure PS, and raise the pressure of the operating oil if PM<PS, and switch from the injection speed control to the injection pressure control at the moment when PM=PS is established, and perform injection while controlling the injection pressure so as to accord with a predetermined mold internal pressure profile, and then proceed to next step s8.

s8: fill the molten resin.

s9: complete filling the molten resin, while keeping the hydraulic pressure of the operating oil.

s10: open the switching valve 49, which is a cooling water supplying valve, to replace the steam in the thermal-medium fluid passage 2a and 3a in the molds with the cooling water.

s11: compare the mold temperature TM with the low-temperature-side set temperature (set mold lower limit temperature) TC of the mold, and continue the cooling of the mold if TM>TC, and then proceed to next step s12 if TM=TC is established. (The lower-temperature-side set temperature TC is a temperature at which the resin filled in the mold cavity solidifies.)

s12: close the switching valve 49, which is the cooling water supplying valve, and stop supplying the cooling water.

s13: left to cool.

s14: unclamp the molds to take out the molded item when the molded item is cooled to a temperature at which the molded item can be taken out.

FIG. 4 is a example showing the mold temperature in a molding cycle, and the injection pressure and the mold internal pressure at the time of injection so that each of them can be compared with each other in the same timescale.

A top section in FIG. 4 shows the molding process, and below the top section, the injection pressure Ph (injection hydraulic pressure), the mold internal pressure PM, and the screw position St are displayed so as to corresponds to the timings of the molding process. At the further following row, the mold temperature TM is shown.

That is, from the lower portion to the upper portion at the center of the screen, the first correlation diagram 81, the fourth correlation diagram 84, the eighth correlation diagram 88, and the third correlation diagram 83 described above are sequentially arranged. The molding process is shown at the uppermost portion, and the mold temperature adjustment process is shown at the lowermost portion. As described above, the respective time axes are common to each other, and in accordance with the time axes, the switching timings (beginning of filling A to completing of pressure keeping D) of the injection operations are displayed.

In FIG. 4, in each of the correlation diagrams relating to the injection pressure Ph (injection hydraulic pressure) and the mold internal pressure PM, the normal filling process Ka starts after the time to passes from the beginning of filling the resin, and the injection screw 8 passes through the normal filling process Ka at a constant speed, and after the process proceeds to the mold internal pressure control process K2, the mold internal pressure control process K2 is concluded.

At the time point where the mold temperature TM reaches the low-temperature-side set temperature TC which is the predetermined lower-limit cooling temperature, replacement of the thermal medium supplied to the molds, where the cooling water is replaced by the steam, is started. When the state where the mold temperature TM reaches the high-temperature-side set temperature TS to be recognized, the injection in the next molding cycle is started. The filling process in the next molding cycle may be become at any timing by using a timer or the like, even before the mold temperature TM reaches the high-temperature-side set temperature TS.

With this configuration, it is possible to evaluate the appropriateness of the molding condition depending on the following. The mold internal pressure profile measured by the mold internal pressure sensor 19 and the temperature waveform of the molds 2 and 3 measured by the mold internal resin temperature sensor 28 provided in the vicinity of the cavity 4 are displayed on the same screen of the image display unit 50. Then, the variations in the mold internal pressure are correlated with the timing of the temperature elevation and the amount of the temperature elevation in the mold temperature TM, which are caused by the influx of the high-temperature resin while injecting and filling the resin into the molds.

In particular, for the purpose of comparison, it is preferable that the measured mold internal pressure profile and the temperature waveform of the mold be plotted on the same graph, with the common time axis being the horizontal axis and the respective values being the vertical axis.

With this display, the selection of the switching timing between the processes can be imaged easier, and the selection of the appropriate switching timings between the steam and the cooling water becomes easy, since the graph of the mold temperature TM and the mold internal pressure PM shown in the image display unit 50 are checked visually to appropriately select switching timings between the steam and the cooling water.

Since the mold internal pressure PM and the mold temperature TM are displayed on the same time sequence of the molding processes, it is effective to evaluate the appropriateness of selecting a set value for controlling the mold internal pressure waveform, a temperature set value for controlling heating and cooling, a set value of switching timings between the cooling process and the injection processes (injection speed v or injection pressure Ph) or the mold heating process. For example, it is easy to determine the position of the mold internal pressure sensor and a set value, that is robust to external disturbance, and that can reduce the mold-heating energy and the pressure-filling energy.

Below, variations of the display of the image display unit 50 as described above will be described in detail as a second embodiment to a ninth embodiment.

(Second Embodiment)

Figure 5:
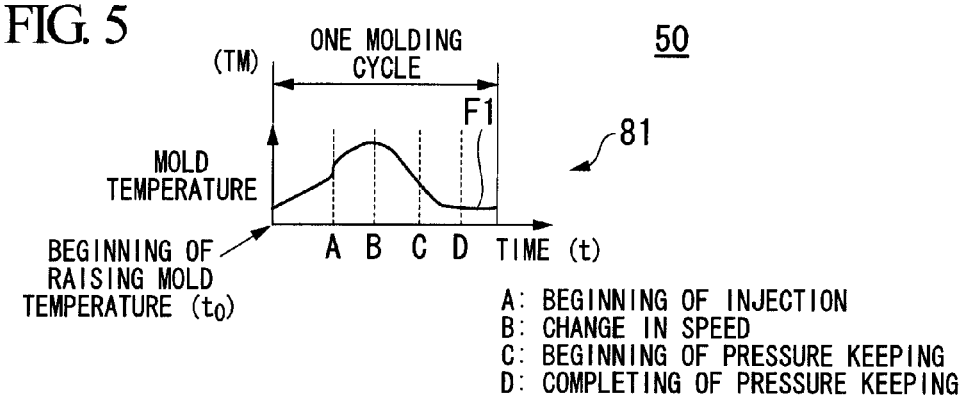
FIG. 5 relates to a second embodiment of the present invention, and is a diagram showing an example of a indication on an image display unit 50, and is a diagram showing an example of a first correlation diagram 81.

FIG. 5 is a diagram showing an example of the display of the image display unit 50 according to a second embodiment of the present invention, and is a diagram exemplifying the first correlation diagram 81. The same reference numbers are attached to constitutional elements similar to that in the configuration described above, and an explanation thereof is omitted.

The first correlation diagram 81 shown in FIG. 5 shows a relativity between the mold temperature TM and the time t in a molding cycle, and shows set values for the switching timings (beginning of filling A to completing of pressure keeping D) along with this correlation. In the first correlation diagram 81, the time for starting to raise the mold temperature is set as the initial time t0.

According to the configuration of this display, since the relationship between the mold temperature TM and the injection operations can be clearly recognized in a visual manner, various factors concerning the transition of the mold temperature TM can be easily examined, and can correctly evaluate the appropriateness of the selection of the set values for the switching timings of each of the injection operations, the control conditions for the injection operations, and the control conditions (switching timings of steam, cooling water and the like) for the mold temperature TM. This embodiment will be described with reference to FIG. 6.

Figure 6:
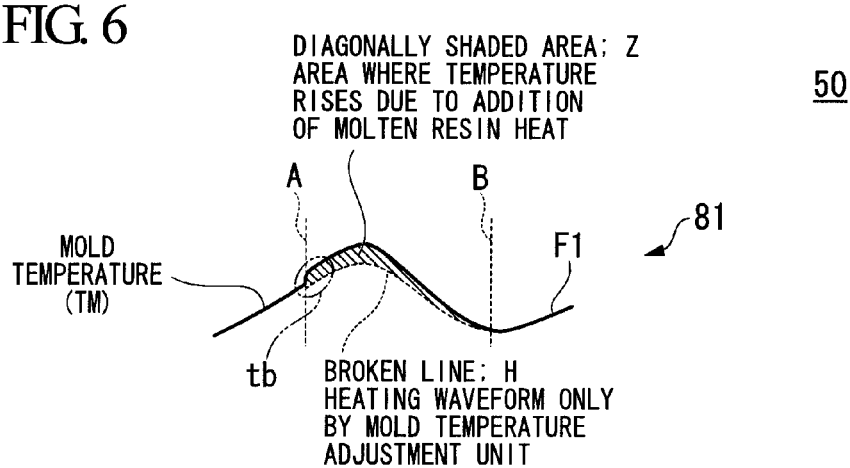
FIG. 6 relates to a second embodiment of the present invention, and is a enlarged view of a part of the first correlation diagram 81.

FIG. 6 is a diagram in which a part of the first correlation diagram 81 is enlarged.

As described above, as the temperature-rising factor of the mold temperature TM, there is a shear heat generated at the beginning of filling into the cavity 4. Assuming that only the mold temperature TM is displayed on the image display unit 50, clear estimation of what kind of temperature-rising factor causes this phenomenon is not possible, when the rate of change of temperature increases.

However, according to the injection molding device 1, as shown in FIG. 6, the mold temperature waveform and the switching timings (at the beginning of filling A) of the injection operations is displayed from the beginning of the mold heating, and hence, the correspondence between the mold temperature TM and the injection operations can be visually recognized. That is, in the temperature waveform showing the mold temperature Tm from the beginning of the mold heating, if there exists a discontinuous point tb where the rate of change in temperature changes immediately after the beginning of filling A, it can be easily estimated that this temperature-rising factor is the shear heat of the molten resin at the beginning of filling. On the basis of this estimation, it becomes also easy to estimate a temperature-rising zone Z where the shear heat of the molten resin works, and a transition (graph H with a broken line in FIG. 6) of a change in temperature only by the temperature adjustment unit 25.

Additionally, when the molds 2 and 3 are maintained at a high temperature, there is a case where control of maintaining the mold temperature TM at a predetermined temperature is performed by alternately turning on and off the heating of the molds 2 and 3 by using a temperature detector or timer. Also in this case, selection of the control adjustment values for turning on and off the heating of the molds 2 and 3 become easy, since it is possible to make the correlation between the mold temperature TM and the temperature-rising factor clear, by simultaneously displaying the mold temperature display and the switching timings of the injection operations.

Therefore, for example, it can be determined whether the rise in the mold temperature TM can be controlled only by the temperature adjustment unit 25, or the rise in the mold temperature TM is a temperature rise caused by heat from the molten resin and is caused by the shear heat that cannot be controlled only by the temperature adjustment unit 25. And the evaluation of the appropriateness of the control condition for the injection operations and the control condition for the mold temperature become easy, and it is possible to contribute to the determination of the appropriate control condition, such as a change in the injection speed which is a control condition so as to alleviate an amount of the generated shear heat. Note that the control device 20 or the image display unit 50 may have an enlarging display function, and may have a function of automatically enlarging a portion where the rate of change in temperature increases or the vicinity thereof. It may also be possible to emphasize the display by changing colors.

(Third Embodiment)

Figure 7:
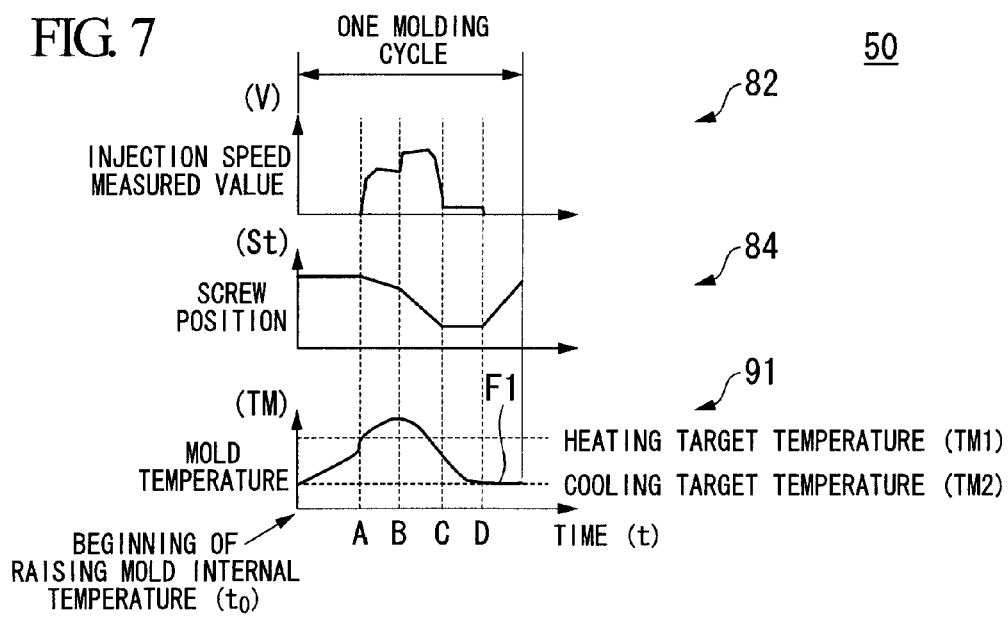
FIG. 7 relates to a third embodiment of the present invention, and is a diagram showing an example of display of the image display unit 50, and is a diagram showing a configuration in which a first correlation diagram 91 and other types of correlation diagrams are disposed and displayed.

FIG. 7 is a diagram showing an example of display of the image display unit 50 according to a third embodiment of the present invention, and is a diagram showing a configuration in which a first correlation diagram 91 and other correlation diagrams are laid out so as to be able to compare with each other. Note that the same reference numbers are attached to constitutional elements similar to that in the configuration described above, and an explanation thereof is omitted.

More specifically, from the lower portion to the upper portion of the image display unit 50, the first correlation diagram 91, the fourth correlation diagram 84, and the second correlation diagram 82 are displayed.

The first correlation diagram 91 has similarities to, but is different from the first correlation diagram 81 in that the diagram 91 displays a heating target temperature TM1 and a cooling target temperature TM2 of the molds 2 and 3, that are stored in the control device 20.

The second correlation diagram 82 is created to show a correlation between a measured value of the injection speed v and time t corresponding to a transition of the measured value of the injection speed v on the same timescale as the first correlation diagram 91.

In general, the measured values of the injection speed v and the injection pressure ph are less responsive due to inertia of, for example, operation members connected to the injection screw 8, and the switching timings of operations are not clear. However, according to the configuration of the display as described above, the second correlation diagram 82 and the first correlation diagram 91 that shows set values for the switching timings of the respective injection operations are laid out and displayed on the same timescale in a manner such that the two diagrams can be compared with each other. Based on this, the appropriateness of the switching timings of the injection operations with respect to the mold temperature TM, and conversely, the appropriateness of the mold temperature TM with respect to the switching timings of the injection operations can be evaluated with high accuracy, and efficient alteration of the molding condition to improve the quality of the molded item and the productivity is enabled.

Additionally, with this display configuration, since the fourth correlation diagram 84 is displayed, the relativity between the degree of filling of the molten resin and the mold temperature TM can be clearly obtained. This enables alteration of the control conditions such as the injection speed v and the injection pressure Ph, so as to complete the filling operation before the mold temperature TM becomes the solidifying temperature of the resin. In particular, when the fourth correlation diagram 84 showing the screw position St is displayed, it is efficient for improvement of the conditions, for example, to perceive the correlation between the mold temperature TM and the degree of progress of filling, and then to alter the injection speed v and the injection pressure Ph so as to complete the filling before the mold temperature TM becomes the solidifying temperature of the resin. This makes it easy to evaluate the effect from the injection condition and the mold temperature condition on the appearance, deformation, fins or other molding defects of the molded item, whereby the molding properties are improved. Additionally, since the heating target temperature TM1 and the cooling target temperature TM2 are displayed in the first correlation diagram 91, the difference between each of the target temperatures and the measured mold temperature TM can be easily obtained, whereby the evaluation of the control conditions for the mold temperature TM can be easily made.

(Fourth Embodiment)

Figure 8:
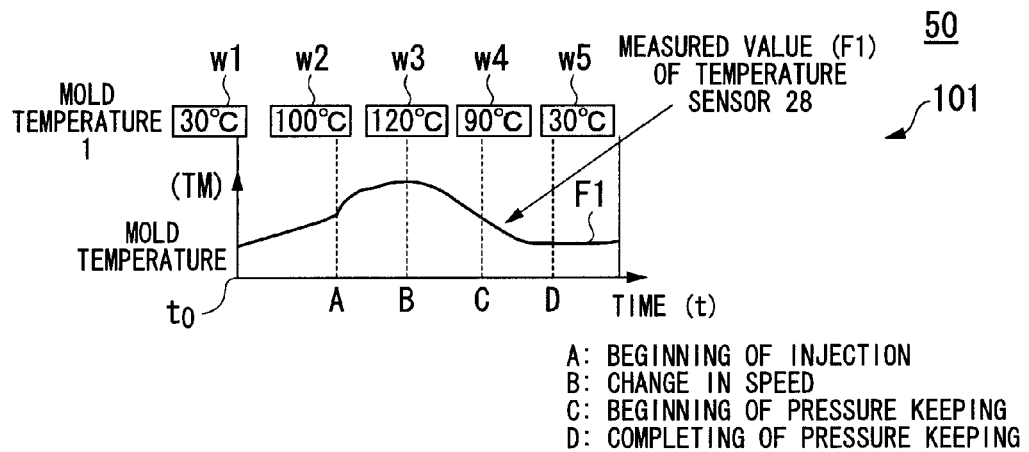
FIG. 8 relates to a fourth embodiment of the present invention, and is a diagram showing an example of display of the image display unit 50, and is a diagram showing a first correlation diagram 101.

FIG. 8 is a diagram showing an example of the display of the image display unit 50 according to a fourth embodiment of the present invention, and is a diagram showing a first correlation diagram 101. The same reference numbers are attached to constitutional elements similar to that in the configuration described above, and an explanation thereof is omitted.

As shown in FIG. 8, in the first correlation diagram 101, an initial time t0, and values of the mold temperature TM at each of the switching timings (beginning of filling A to completing of pressure keeping D) in windows w1 to w5 are displayed.

With this display configuration, since the values of the mold temperature TM at the switching timings of the injection operations can be clearly obtained, the mutual appropriateness between of the switching timings of the injection operations and the mold temperature TM can be evaluated in a quantitative manner. This makes it possible to, for example, control the values of the mold temperature at the timing immediately before full-shot to be a mold temperature TM that does not cause the fins or other molding defects.

In particular, when mold temperature values at the beginning of the pressure keeping C and at the completing of the pressure keeping D are displayed, a change mold internal temperature during the pressure keeping operation can be clearly obtained, and hence, the resin maintains a flowing state at the time of the pressure keeping, which makes it possible to control the mold temperature to be a temperature at which the pressure keeping effectively works, and to select control conditions under which the pressure keeping duration can be controlled.

(Fifth Embodiment)

Figure 9:
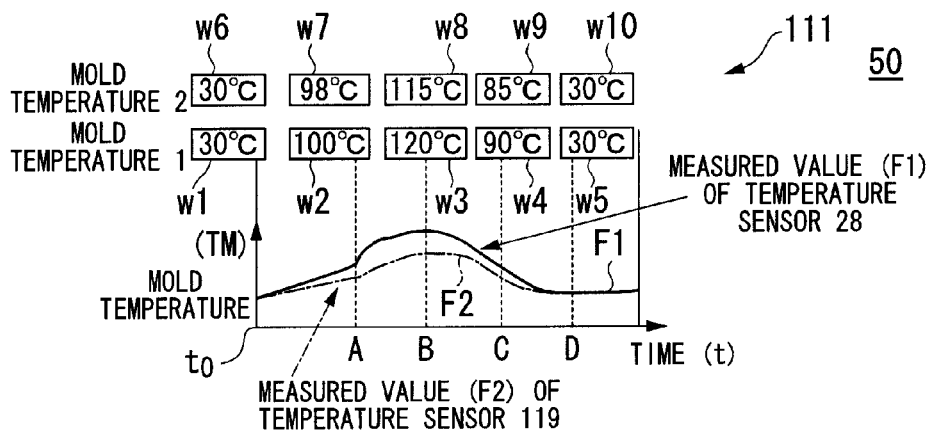
FIG. 9 relates to a fifth embodiment of the present invention, and is a diagram showing an example of display of the image display unit 50, and is a diagram showing a first correlation diagram 111.

FIG. 9 is a diagram showing an example of display of the image display unit 50 according to a fifth embodiment of the present invention, and is a diagram showing a first correlation diagram 111. The same reference numbers are attached to constitutional elements similar to that in the configuration described above, and an explanation thereof is omitted.

The first correlation diagram 111 shows a temperature waveform F1 and a temperature waveform F2. To display the first correlation diagram 111, the injection molding device 1 is provided with a temperature sensor 119 that measures a mold temperature, in addition to the mold internal resin temperature sensor 28. More specifically, the temperature sensor 119 is disposed on the downstream side from the mold internal resin temperature sensor 28 in the fluid passage of the molten resin within the cavity 4.

Additionally, in the first correlation diagram 111, an initial time t0, and values of the mold temperature TM detected at the switching timings (beginning of filling A to completing of pressure keeping D) by the mold internal resin temperature sensor 28 are displayed in the respective windows w1 to w5. Similarly, an initial time t0, and values of the mold temperature TM detected at the switching timings (beginning of filling A to completing of pressure keeping D) by the temperature sensor 119 are displayed in the respective windows w6 to w10.

According to this display configuration, since the plural mold temperatures TM of the molds 2 and 3 can be measured, control conditions can be selected while taking the relativity between the flowing state and the mold temperature into consideration. In particular, when the first correlation diagram 111 is displayed and disposed with the second correlation diagram 82 or the fourth corresponding diagram 84, the amount of filling of the molten resin can be imaged by the amount of screw movement in the fourth correlation diagram 84. According to this, by evaluating the state of the molded item in the vicinity of the temperatures sensor while considering the temperature at each of the sensor positions and the progress of the injection operations or the switching timings of the injection operations, it becomes easy to find out the selection of an appropriate switching timings of the steam (heating medium) and the cooling water (cooling medium), and the injection conditions. Note that the plural temperature waveforms F1, F2 may be superimposed, or may be selectably displayed.

(Sixth Embodiment)

Figure 10:
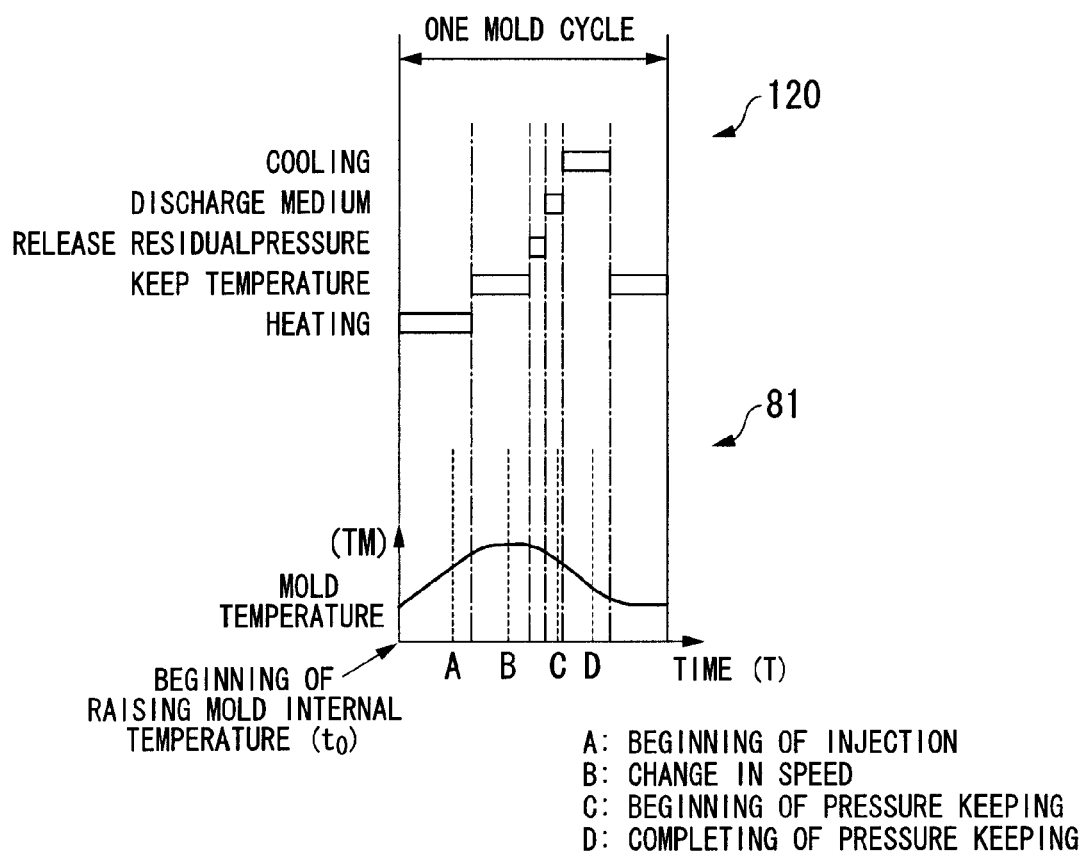
FIG. 10 relates to a sixth embodiment of the present invention, and is a diagram showing an example of display of the image display unit 50, and is a diagram showing the first correlation diagram 81 and process settings 120 of a mold temperature control.

FIG. 10 is a diagram showing an example of display of the image display unit 50 according to a sixth embodiment of the present invention, and is a diagram showing the first correlation diagram 81 and a process setting 120 of the mold temperature control. Note that the same reference numbers are attached to constitutional elements similar to that in the configuration described above, and an explanation thereof is omitted.

The process setting 120 can be divided into a heating period, a temperature keeping period, a residual-pressure releasing period, a medium discharging period, and a cooling period in the mold temperature control, and each of the periods is displayed by bar graph. In addition to the items above, it is preferable that the process setting 120 further include a mold-temperature adjustment control parameter such as a thermal-medium discharging period.

With this display configuration, since the responsiveness of the change mold internal temperature in the mold temperature control can be obtained, each of the periods becomes a necessary and sufficient period, a molding cycle can be shorten, and occurrence of defective molded item due to the insufficient duration for each of the periods can be prevented. That is, it is possible to optimize the control conditions for the mold temperature control.

(Seventh Embodiment)

Figure 11:
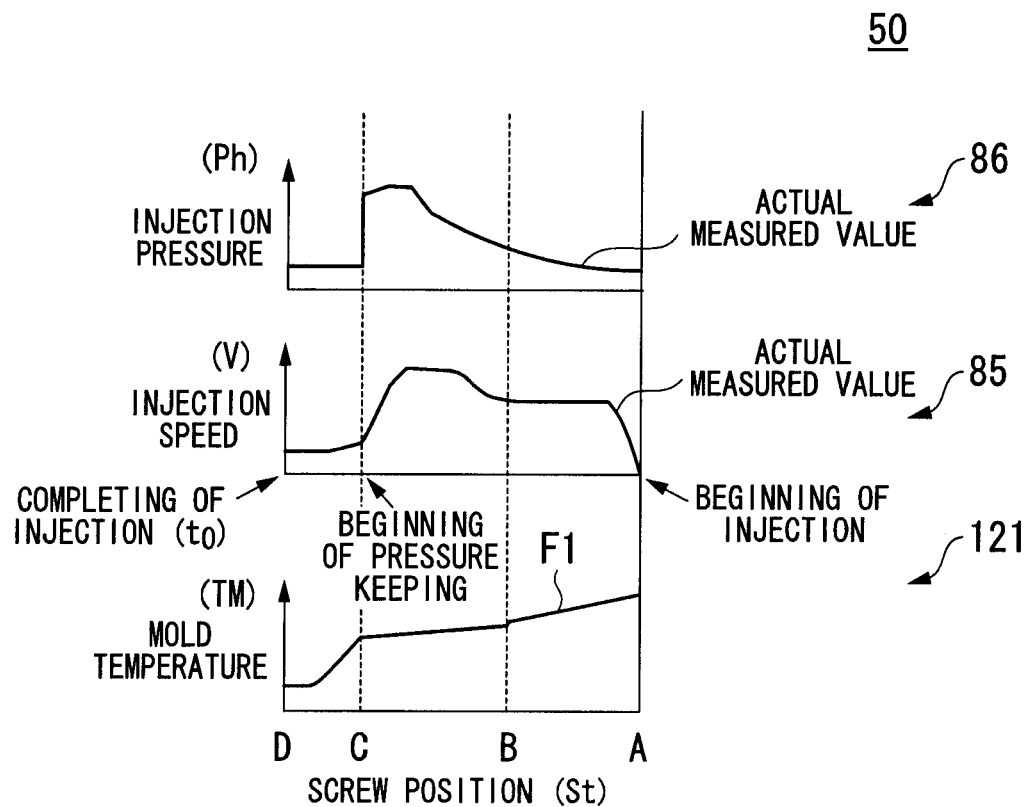
FIG. 11 relates to a seventh embodiment of the present invention, and is a diagram showing an example of display of the image display device 50, and is a diagram showing a configuration in which respective relations of a mold temperature TM, an injection speed v, and an injection pressure Ph relative to a screw position St are displayed.

FIG. 11 is a diagram showing an example of display of the image display unit 50 according to a seventh embodiment of the present invention, and is a diagram showing a configuration in a manner that can compare respective relativities of the mold temperature TM, the injection speed v and the injection pressure Ph with respect to the screw position St.

As shown in FIG. 11, the control device 20 arranges and displays a first correlation diagram 121 showing a relativity between measured values of the screw position St and the mold temperature TM, a fifth correlation diagram 85 showing a relativity between measured values of the screw position St and calculation values of the injection speed v, and a sixth correlation diagram 86 showing a relationship between measured values of the screw position St and measured values of the injection pressure Ph, in the order presented above.

The first correlation diagram 121, the fifth correlation diagram 85, and the sixth correlation diagram 86 are integrated on the common scale of the screw position, and each have the switching timings (beginning of filling A to completing of pressure keeping D) of the injection operations displayed thereon.

According to this display configuration, even if the injection speed v rapidly changes, the relativity between the mold temperature TM and the injection speed v become conspicuous.

That is, when the injection speed v rapidly increases from a low speed to a high speed, or rapidly decreases from a high speed to a low speed, the amount of movement (amount of displacement) of the injection screw 8 becomes greater even for a short period of time, and hence, the amount of resin filled in the molds becomes larger. However, when the mold temperature TM is at the vicinity of the phase changing temperature of the resin such as the melting point, the glass transition temperature, the heat-deformation temperature, the coagulation point, and the crystallization temperature, the quality of the molded item may be largely affected by the resin-filling state at a point where the injection speed v switches.

However, since the first correlation diagram 121 shows the relativity between the mold temperature TM and the screw position St, the change in the mold temperature TM is displayed with respect to the amount of screw movement regardless of the changing rate (acceleration) of the injection speed v. So, the change in the mold temperature during the acceleration or deceleration of the injection speed can be easily recognized, whereby the appropriateness of the control conditions can be evaluated.

(Eighth Embodiment)

Figure 12:
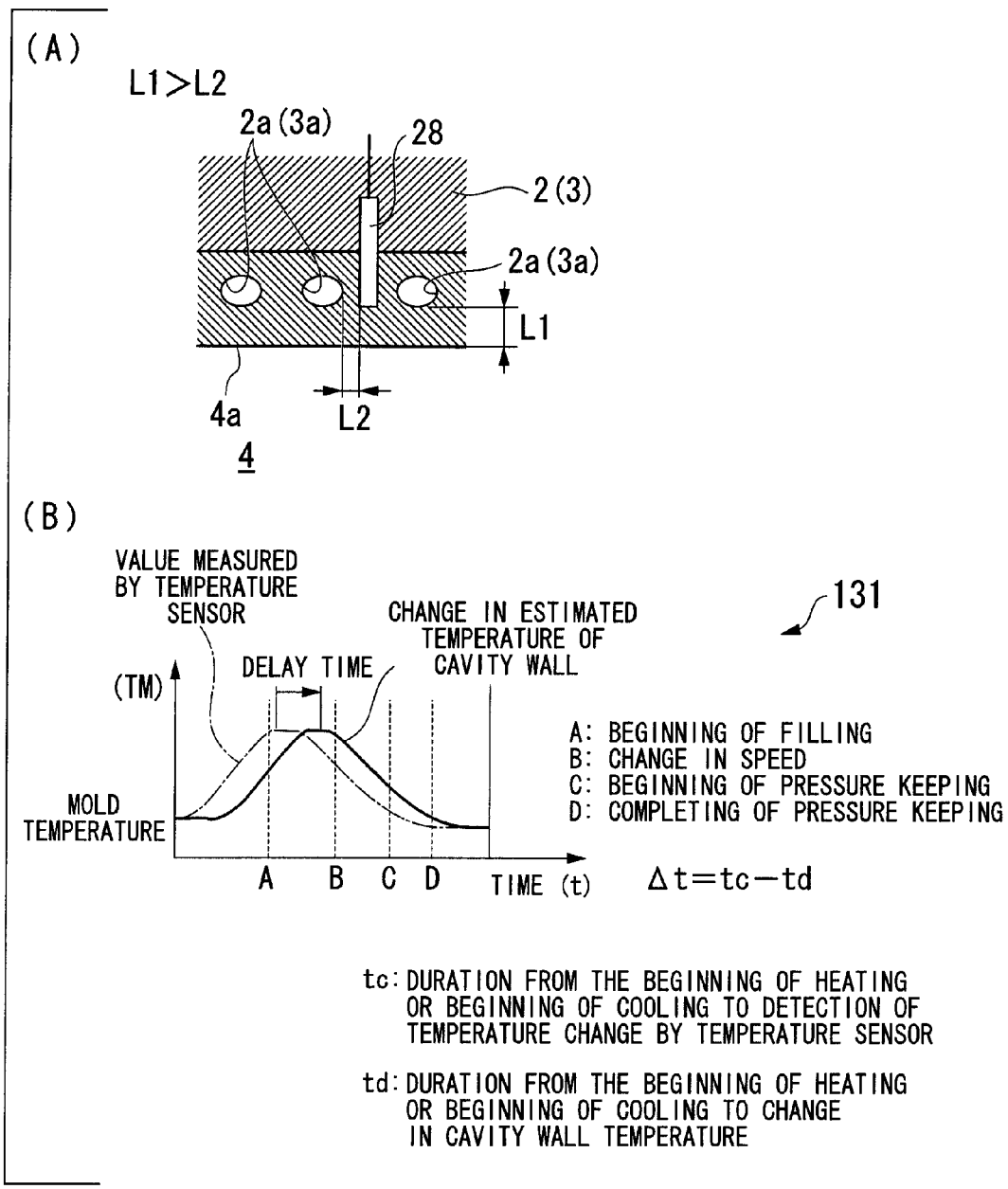
FIG. 12 relates to a eighth embodiment of the present invention, and is a diagram showing a schematic configuration in the vicinity of a mold temperature sensor, where FIG. 12 (A) is a sectional view in which a main portion is expanded, and FIG. 12 (B) is a diagram showing a first correlation diagram 131 in which the mold temperature TM is corrected by a predetermined value.

FIG. 12 is a diagram showing a schematic configuration in the vicinity of the mold temperature sensor 28 according to an eighth embodiment of the present invention; FIG. 12A is a sectional view in which a main portion is expanded; and, FIG. 12B is a diagram showing a first correlation diagram 131 in which the mold temperature TM is corrected by a predetermined value. Note that the same reference numbers are attached to constitutional elements similar to that in the configuration described above, and an explanation thereof is omitted.

Due to the difference in temperature propagation times caused by the difference between a distance from a heating-cooling source (thermal-medium fluid passage 2a and 3a) to the mold internal resin temperature sensor 28 and a distance from the mold heating-cooling source to the cavity wall surface 4a in the mold temperature control, it is conceivable that a change in the mold temperature TM detected by the in-mold resin temperature sensor 28 delays or advances with respect to a change in temperature of the cavity 4. Such temperature shift leads to a factor of that inappropriate control conditions are selected at the time of deciding the control conditions.

The control device 20 corrects this temperature shift, and displays the first correlation diagram 131.

More specifically, as shown in FIG. 12 (A), when a distance L1 from the cavity 4 to the thermal-medium fluid passage 2a or 3a is greater than a distance L2 from the mold internal resin temperature sensor 28 to the heating-cooling source, a time tc from the beginning of heating or beginning of cooling to a detection of a change in temperature by the mold internal resin temperature sensor 28 is smaller than a time td from the beginning of heating or beginning of cooling to a change in temperature of the cavity wall 4a. In short, since a temperature change occurs faster in the mold internal resin temperature sensor 28 than the cavity 4, the temperature change in the cavity 4 delays.

The control device 20 takes this delay into account, and displays the entire waveform of the mold temperature TM so as to delay it by time |tc−td|=tΔ. That is, the temperature of the cavity 4 is estimated on the basis of the mold temperature TM, and the estimated temperature is displayed as the first correlation diagram 131. Note that the switching timings (beginning of filling A to completing of pressure keeping D) of the injection operations are displayed without the correction.

FIG. 13 is a diagram showing a schematic configuration in the vicinity of the mold temperature sensor 28 according to a ninth embodiment of the present invention; FIG. 13A is a sectional view in which a main portion is expanded; and, FIG. 13B is a diagram showing a first correlation diagram 132 in which the mold temperature TM is corrected by a predetermined value. Note that the same reference numbers are attached to constitutional elements similar to that in the configuration described above, and an explanation thereof is omitted.

To the configuration shown in FIG. 12 described above, as shown in FIG. 13A, when a distance L1 from the cavity 4 to the thermal-medium fluid passage 2a, 3a is smaller than a distance L2 from the mold internal resin temperature sensor 28 to the heating-cooling source, a time tc from the beginning of heating or beginning of cooling to a detection of a change in temperature by the mold internal resin temperature sensor 28 is greater than a time td from the beginning of heating or beginning of cooling to a change in temperature of the cavity wall 4a. In short, since a temperature change occurs faster in the cavity wall 4a than in the mold internal resin temperature sensor 28, the temperature change in the mold internal resin temperature sensor 28 delays.

The control device 20 takes this delay into account, and displays the entire waveform of the mold temperature so as to advance by time |tc−td|=Δt. That is, the temperature of the cavity wall 4a is estimated on the basis of the mold temperature TM, and the estimated temperature is displayed as the first correlation diagram 132.

Note that the Δt described above may be obtained by thermal analysis, and may be obtained by experiments. It may be possible to employ a configuration in which actually measured values of the mold internal resin temperature sensor 28 are displayed, and a horizontal axis showing a waveform may represent a time t or a screw position St.

By displaying the first correlation diagram 131 or 132 while considering the delay or advance of the change in the mold temperature TM detected by the mold internal resin temperature sensor 28 with respect to the change in the temperature of the cavity 4, the cavity wall temperature that directly affects the flowing state of filled molten resin and the switching timings of the injection operations can be displayed in a manner that is more accurately synchronized with each other, and the appropriateness of the settings concerning the injection operations and the settings concerning the temperature adjustment unit 25 can be evaluated with more high accuracy.

Figure 14:
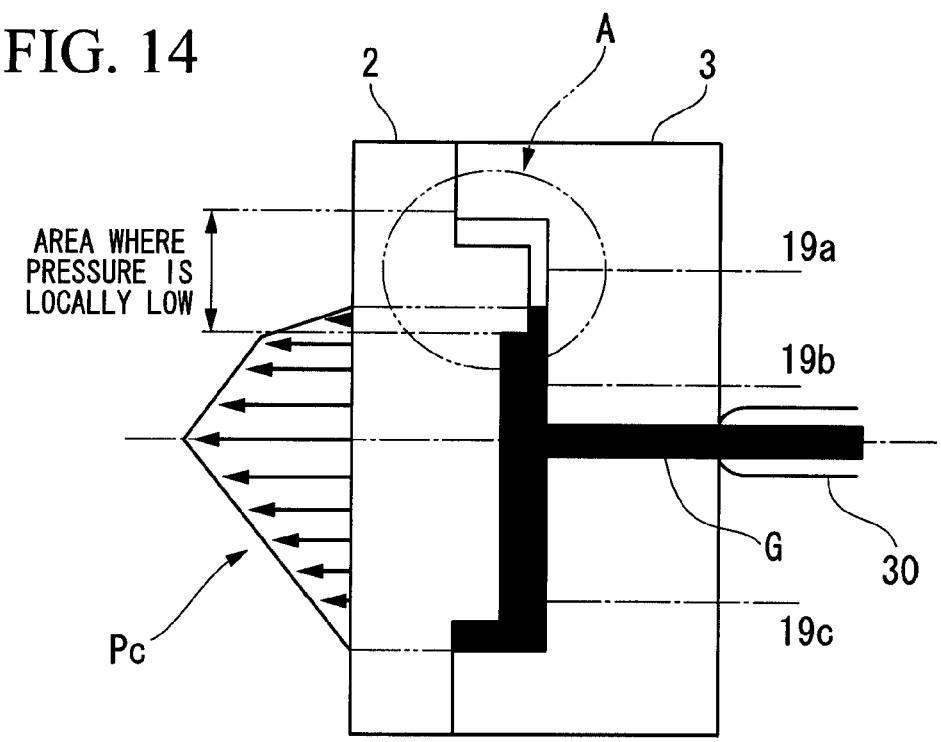
FIG. 14 relates to a conventional mold, and is a schematic diagram showing a pressure distribution in the mold.
Figure 15:
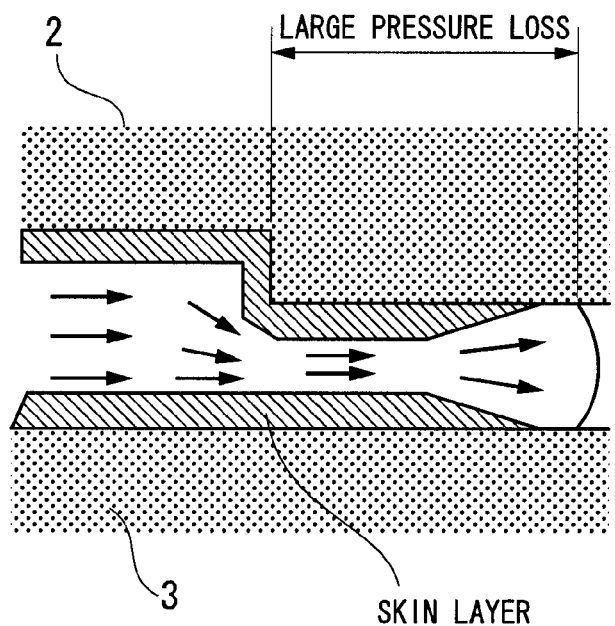
FIG. 15 is a schematic diagram showing a detail of portion A in FIG. 14.

Next, effects obtained by controlling the mold temperature TM and the injection pressure Ph in a synchronized manner as described above will be described with reference to FIGS. 14 to 20. FIG. 14 and FIG. 15 show a flowing state and a pressure state of a stepped cavity section according to a conventional molding.

Figure 16:
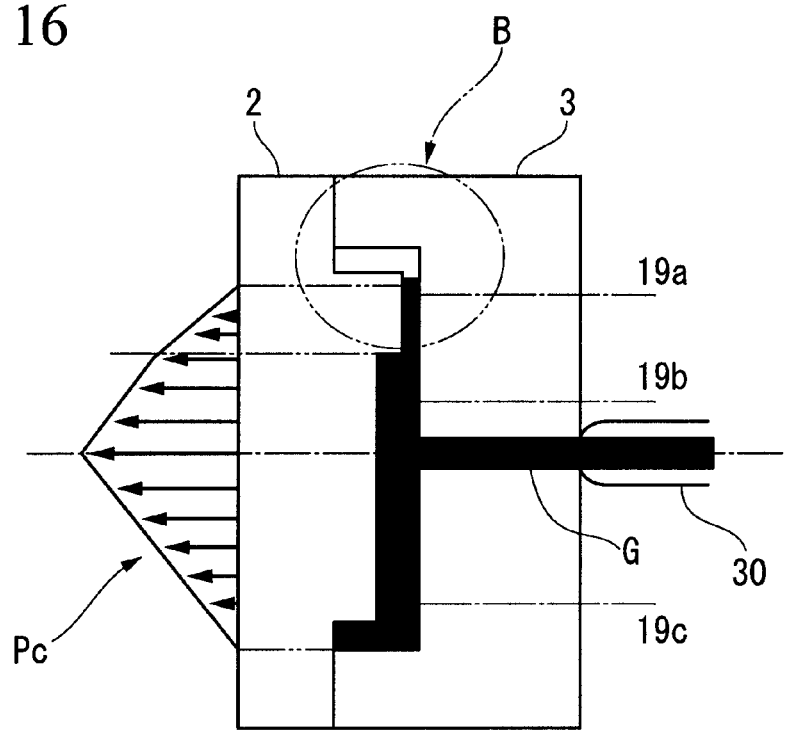
FIG. 16 relates to the present invention, and is a schematic diagram showing a pressure distribution in the mold.
Figure 17:
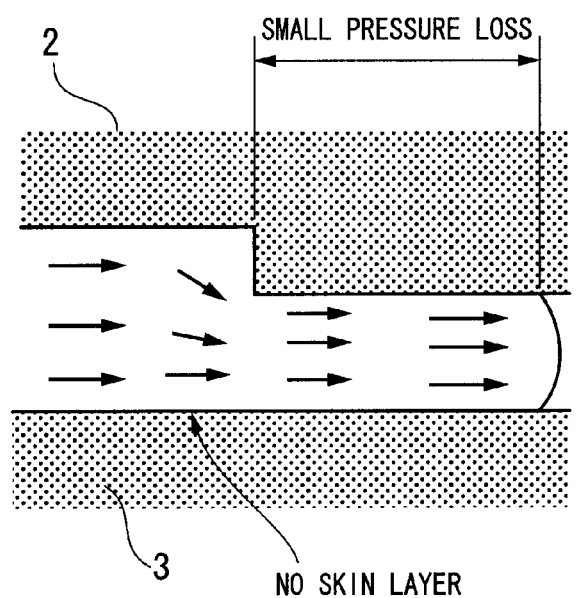
FIG. 17 is a diagram showing a detail of portion B in FIG. 16.
Figure 18:
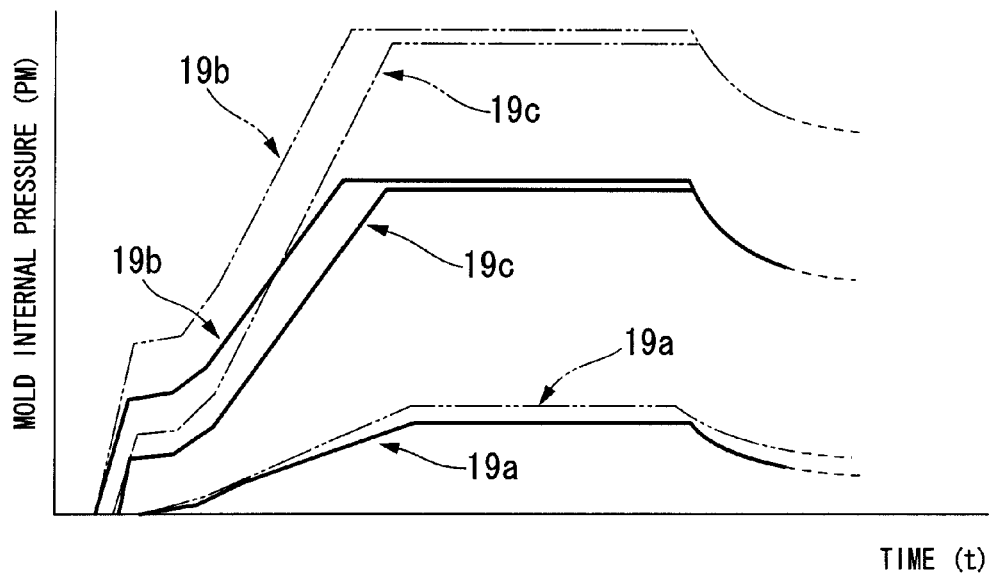
FIG. 18 relates to a conventional mold, and is a schematic diagram showing the mold internal pressure profile detected by each mold internal pressure sensor disposed at different positions.
Figure 19:
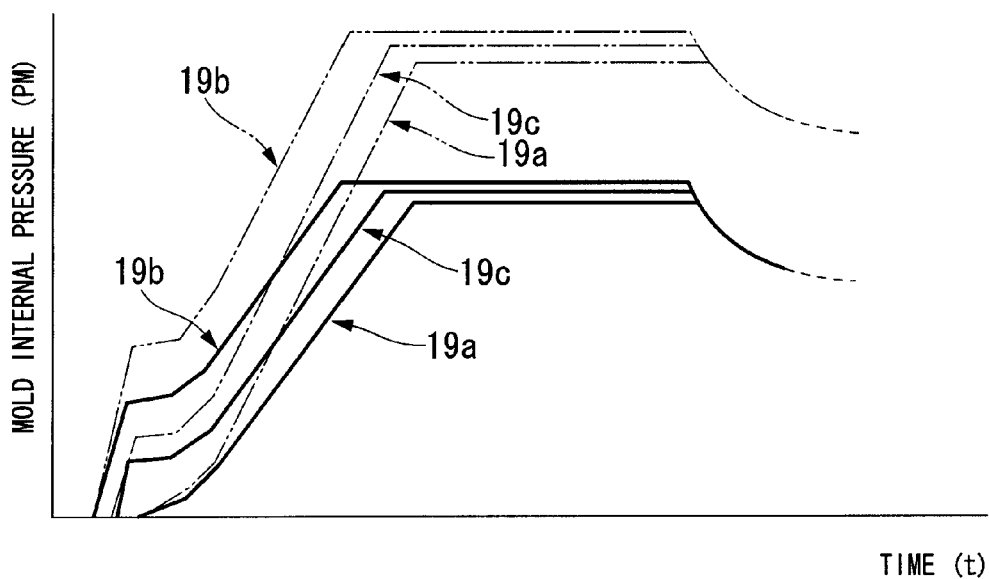
FIG. 19 relates to a present invention, and is a schematic diagram showing a mold internal pressure profile detected by each mold internal pressure sensor disposed at different positions.

FIG. 18 shows a profile of mold internal pressure according to the conventional molding. The continuous line indicates a profile of the mold internal pressure at the time of low-pressure injection, and the alternately long- and double short-dashed line indicates a profile of the mold internal pressure at the time of high-pressure injection. FIG. 16 and FIG. 17 show a flowing state and a pressure state of a stepped cavity section according to the present invention. FIG. 19 shows a profile of mold internal pressure according to the present invention. The continuous line indicates a profile of the mold internal pressure at the time of low-pressure injection, and the alternately long- and double short-dashed line indicates a profile of the mold internal pressure at the time of high-pressure injection.

In FIG. 14 and FIG. 15, since the mold temperature is generally at a resin solidifying temperature, which is lower than or equal to the heat-deformation temperature, a skin layer appears during the filling; a resin-flowable region becomes narrow; a large pressure-loss occurs particularly at a thin-walled section; and a resin-pressure-lowered region occurs locally. On the other hand, for example, a mold internal pressure value detected by a mold internal pressure sensor 19a indicates a much smaller change in the mold internal pressure value, as compared with a degree of change in the mold internal pressure detected by a mold internal pressure sensor disposed at other position such as a mold internal pressure sensor 19b disposed at immediately near the gate, or a mold internal pressure sensor 19c disposed at a position spaced away from the gate.

Therefore, as shown in FIG. 18, when the injection pressure Ph is controlled on the basis of the mold internal pressure value PM detected by the mold internal pressure sensor 19a, even if a target mold internal pressure value PM1 is largely changed, the large change as expected does not occur in the pressure value at the position where the mold internal pressure value PM is small and the amount of resin filled is small such as the mold internal sensor 19a, and hence, the defect in filling or lack of filling occurs. Further, a large number of trial and error is necessary to find the mold internal pressure sensor position where no filling defect or no insufficient filling occur and no molding defect occurs, which deteriorates the work efficiency.

In FIG. 16 and FIG. 17, since the mold temperature during the injection filling is kept at the temperature at the beginning of resin-flowing or higher according to the present invention, the skin layer does not appear; the resin-flowable region expands to the entire cavity width of the mold; and, the pressure loss of resin flowing can be minimized, whereby the difference of the mold internal pressures can be made moderate. Therefore, a difference between a mold internal pressure value detected by the mold internal pressure sensor 19c in the thin-walled section and a mold internal pressure value detected by the mold internal pressure sensor 19b or 19c in the other section becomes small.

For this reason, as shown in FIG. 19, by controlling the injection pressure on the basis of the mold internal pressure value detected by the mold internal pressure sensor 19a to change the target mold internal pressure value PM1, the change in the mold internal pressure as expected can be obtained even at the thin-walled section where the mold internal pressure sensor 19a is disposed. Therefore, it becomes easy to find the position for the mold internal pressure sensor where the filling defect and the insufficient filling do not occur, and no molding defect occurs. Further, even if the mold internal pressure sensor is disposed at any position, the appropriate mold internal pressure value with high controllability can be easily selected, and hence, the position where the mold internal pressure sensor is disposed can be selected in a short time.

In general, since the mold temperature is set at a lower temperature necessary for cooling (for example, a temperature lower than the heat-deformation temperature), the temperature of the resin decreases during the injection filling. In case of molding with crystalline resin, the viscosity of the resin rapidly increases and the crystallization at around crystallization temperature. Additionally, at the time of molding with amorphous resin having the high viscosity of $1 \times 10^3$ Pa·S or more, the pressure loss is large due to the flow. When the molding is performed with the resin as described above and there exists a locally thin-walled section in the shape of the molded item, the solidification of the thin-walled section advances further than that of other sections, and the fluidity of the resin decreases. This increases the flowing pressure loss, whereby the pressure distribution in the mold becomes non-uniform. Hence, the thickness of the molded item may fluctuate, or defects such as flow marks, irregularities and weld lines may occur at the surface. For this reason, a region for positioning the pressure sensor at which control can be performed with high reproducibility and in a stabile manner is extremely narrow. Therefore, a long period of time and huge efforts are required to find the appropriate position for the pressure sensor.

According to the procedures described above, by keeping the mold temperature during the injection filling of the resin at a high temperature, the increase in viscosity of the resin and the cooling solidification can be delayed even at the thin-walled section, and propagation of the filling pressure can be kept in a favorable condition, whereby the distribution of the mold internal pressure can be in a simple uniform condition. Further, since the solidification speed of the resin during the filling becomes slower, even in the unlikely event that the pressure detection for the mold internal pressure feedback is delayed due to the occurrence of a delay in pressure propagation to the molten resin, which is a compressible fluid, a pressure feedback correction control command can be given before the solidification of the resin advances. Therefore, the injection molding with high reproducibility and stability can be performed without precise selection of the position for the pressure sensor, and with almost no change being applied to the conventional mold.

The present invention can be favorably applied in a device configuration or processes as described below. In the following description, the same reference numbers are attached to constitutional elements similar to that in the injection molding device 1, and a description thereof is omitted.

Figure 20:
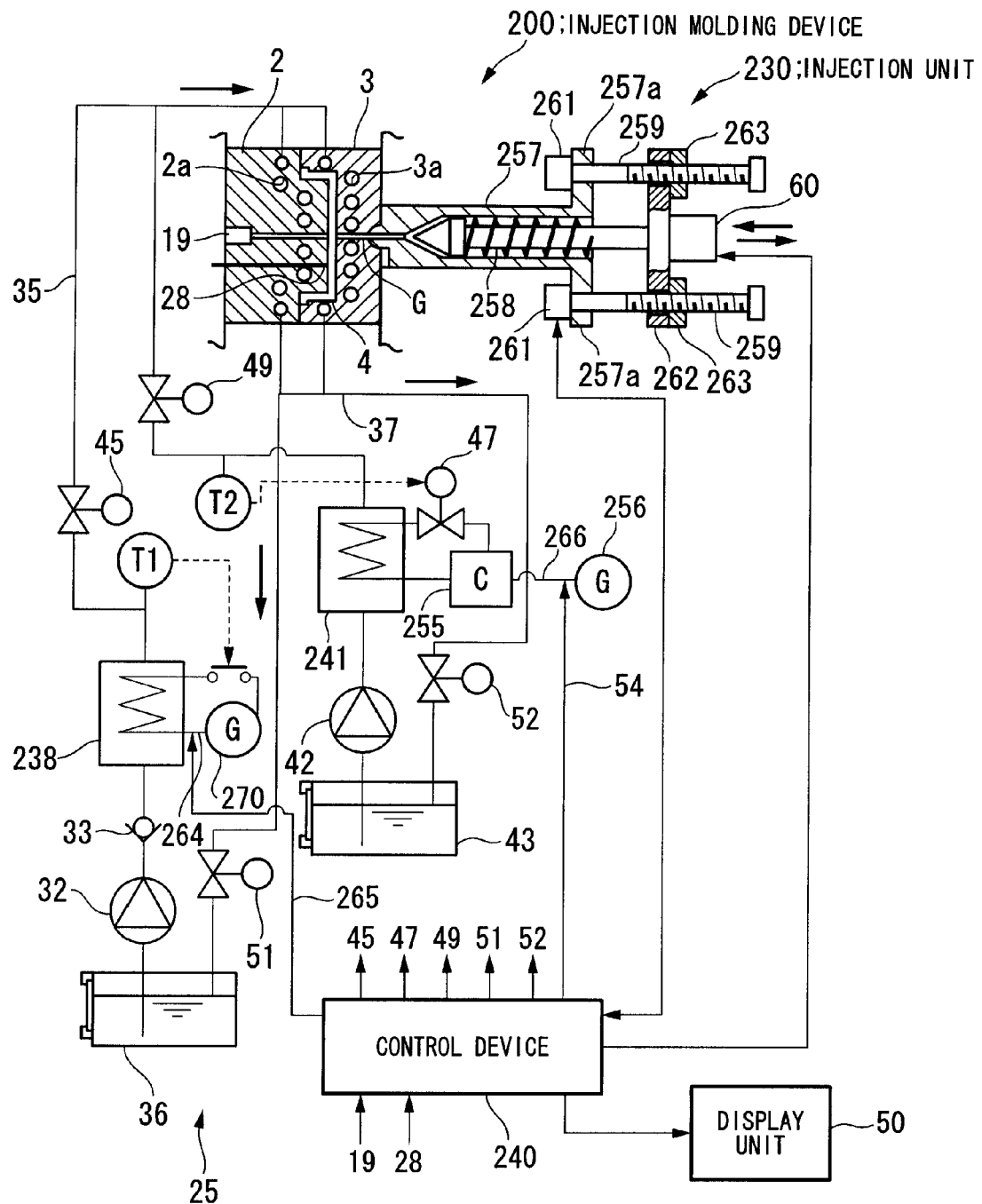
FIG. 20 is a diagram showing an injection molding device 200 that is another structure example of the injection molding device in FIG. 1.

FIG. 20 is a schematic diagram of an injection molding device 200. The injection molding device 200 has almost the same configuration as the injection molding device 1 shown in FIG. 1 except for an injection unit 230.

The injection unit 230 of the injection molding device 200 is configured to include an injection cylinder 257 provided with a pair of arms 257a and 257a integrally formed with an injection cylinder having the same configuration as the injection cylinder 6 of the injection molding device 1 described above and extending toward both sides at a right angle; an injection screw 258 directly connected with a rotational driving motor 60 and the injection screw section has the same shape as the connection shaft 9 of the injection molding device 1 described above but does not have the piston 11; a movement arm member 262 symmetrically fixing ball screw nuts 263 and 263 to the arms extending toward both sides of a housing of the rotational driving motor 60; and ball screw shafts 259 and 259 directly connected to a pair of motors 261 and 261 attached to the arms 257a and 257a of the injection cylinder 257 and threadably mounted on the ball screw nuts 263 and 263.

The procedures of heating the injection cylinder 257 by a not-shown heater; plasticizing and melting the resin material fed into the injection cylinder 257 by rotary-driving the rotational driving motor 60; and feeding the molten resin into the cavity 4 of the molds by rotating the motors 261 and 261 are the same as that of the injection molding device 1 described above, except that the electrically driven motors 261, 261 are used instead of using the hydraulic cylinder 7a and the hydraulic piston 11 for injection and filling.

The injection unit 230 can regenerate the regenerated electric-power generated in the electrically driven motors 261 at the time of deceleration after the injection screw 258 moves forward for injecting and filling the molten resin, from a control device 240 through a circulating circuit 265 to an electric power circuit 264 for mold heating formed by an electric storage device 270 and electric heating devise 238, or through a circulating circuit 54 to an electric power circuit 266 for driving a cooling device 241 formed by an electric storage device 256 and electric cooling devise 255 (for example, Japanese Examined Patent Application, Second Publication No. S64-4896).

Figure 21:
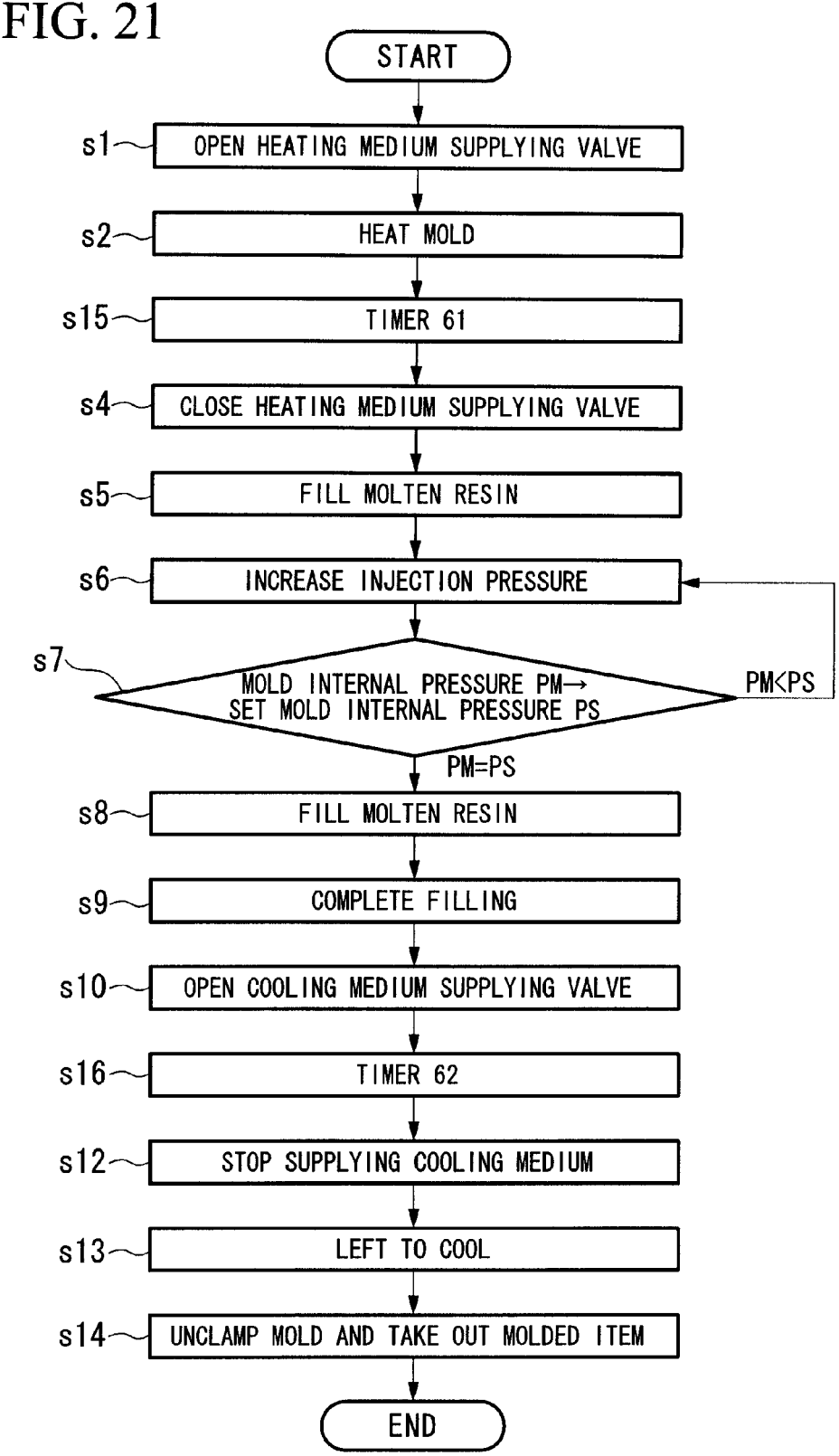
FIG. 21 is a process chart showing an example of a molding procedure using the mold heating-cooling control circuit in FIG. 1.

FIG. 21 is a process diagram showing a molding procedure different from that shown in FIG. 3 employing the injection molding device 1 or the injection molding device 200. The molding procedure shown in FIG. 21 is different from the molding procedure shown in FIG. 3 in that the mold temperature comparing control step in step s3 is replaced with step s15 of a timer 61, and similarly, the mold-temperature comparing control step in step s11 at the time of cooling the molds is replaced with step s16 of a timer 62. No change is made for other steps and sequence thereof s15: count up by the timer 61.

s16: count up by the timer 62.

At a point in time of counting up of the timer 62, which starts counting at a point in time when the mold starts to be cooled, the replacement of the thermal-medium supplied to the molds from the cooling water to the steam is started, and the timer 61 starts to count at a point in time K3 when the molds start to be heated. At the point in time when the time 61 counts up, the next molding cycle of injection is started.

For both the timer 61 and the timer 62, the starting point and time can be adjusted, and optimum timings of the starting point and the time-up point can be determined by adjusting the settings earlier or later while considering the overshoot of the temperature-rising or temperature-lowering of the molds.

If the temperature of the steam or cooling water and the supplying speed thereof are the same, the heating duration or cooling duration of the molds is almost the same in each of the molding cycles. Therefore, the replacement of the steam or cooling water does not cause the deviation in the heating duration or cooling duration of the molds from the molding conditions if the time of the timer 61 or the timer 62 is set with some margin.

Figure 22:
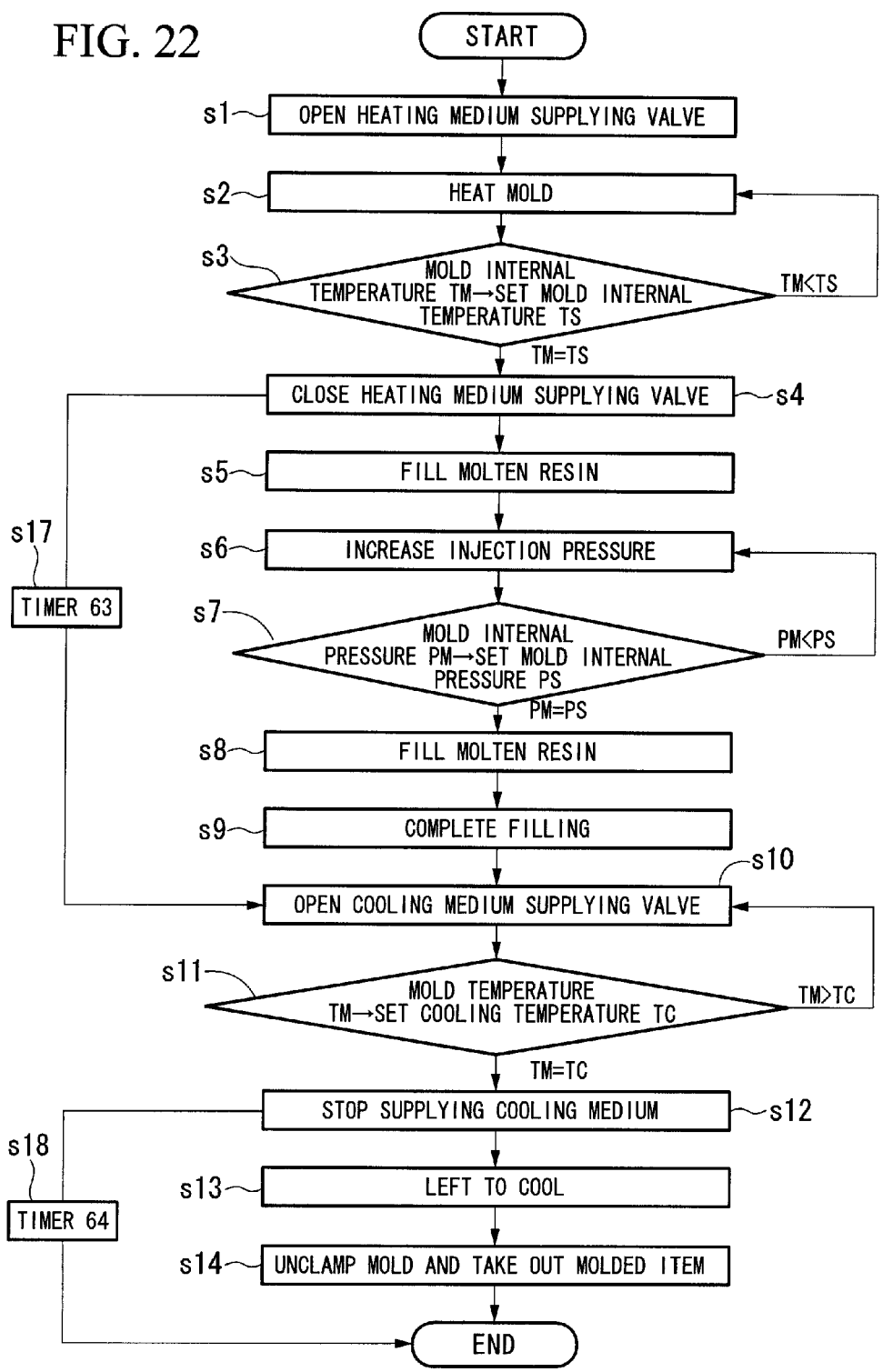
FIG. 22 is a process chart showing an example of a molding procedure using the mold heating-cooling control circuit in FIG. 1.

FIG. 22 is a process diagram showing a molding procedure different from that shown in FIG. 3 employing the injection molding device 1 or the injection molding device 200. The molding procedure shown in FIG. 22 is different from the molding procedure shown in FIG. 3 in that step s17 of a timer 63 is inserted between step s4 of closing the steam supplying valve and step s10 of opening the cooling water supplying valve, and step s18 of a timer 64 is inserted between step s12 of stopping supplying the cooling water and step s1 of starting supplying the steam. No change is made for other steps and sequence thereof.

s17: the timer 63 starts counting. By the count up of the timer 63, proceed to step s10 of starting supplying the cooling water.

s18: the timer 64 starts counting. By the count up of the timer 64, proceed to step s1 of starting supplying the steam.

At a point in time of counting up of the timer 64, which starts counting at a point in time when the mold temperature TM reaches a predetermined low-temperature-side set temperature (set mold lower limit temperature) TC, the cooling is switched to the heating, and the timer 61 in the next cycle starts counting.

When the temperature comparing control is unstable at an initial stage of molding operations, the switching timing between the steam and the cooling water may be set at a timing at which two conditions of the temperature and the timer are established.

Additionally, although the timing at which the cooling starts is set at a point in time when filling is completed or the timer counts up, the cooling may start at a point in time when a pressure at a predetermined position of the cavity reaches a predetermined pressure value that is set in advance. By selecting the predetermined position of the cavity at a position for which high quality appearance and high transfer property are required, the cooling can be started by confirming, during the injection operations, whether the pressure at the position which the high quality appearance and high transfer property are required reaches a pressure value effective for the transfer. This makes it possible to reliably obtain the transfer property, and is effective at shortening the molding cycle.

Further, the cooling may be started at a point in time when the injection screw 8 or 258 reaches a predetermined position that is set in advance. Since the injection process is performed by the pressure control after the mold internal pressure PM reaches a set mold internal pressure PS, the injection screw 8 or 258 cannot move forward and stops before the filling of the cavity 4 is completed when the set mold internal pressure PS set in advance is insufficient for filling. In this state, when the control device 20 or 240 judges that the filling is completed and starts the cooling, the resin in the cavity 4 is solidified under the insufficient filling state, which causes the molding defect. To deal with this case, if the necessary condition for starting the cooling is that the injection screw 8 or 258 reaches a screw position at which the cavity 4 can be sufficiently filled with the resin, the occurrence of the molding defect due to the fact that the resin in the cavity 4 solidifies in the state of insufficient filling can be prevented.

Additionally, as for the starting of the cooling, the timing of starting the supplying of the cooling water may be set by selecting at least one timing from among the point in time when the steam supply is completed or when the timer counts up, which starts counting at the completion of the steam supply, the point in time when a pressure at a predetermined position of the cavity 4 reaches a predetermined pressure value set in advance, and the point in time when the injection screw 8 or 258 reaches a predetermined position set in advance. Since any one or two or all conditions of the timer, the in-cavity pressure, and the screw position can be selected, the setting range for the molding condition can be enlarged, whereby the molding property can be improved. As for the manner of selecting the condition above, various methods may be possible such as satisfaction of all the selected conditions, and satisfaction of any one of the selected conditions.

For example, the injection molding method described above is preferable in a case where the resin is a crystalline resin.

With the crystalline resin, its viscosity rapidly increases at around a crystallization temperature at the time of cooling and solidifying, the flowing state cannot be maintained, and the pressure propagation property rapidly deteriorates. For this reason, by setting the mold temperature at a temperature equal to or more than the flowing starting temperature that is sufficiently higher than the crystallization temperature, the flowing state of the resin can be maintained. By maintaining the pressure propagation in a favorable state, it is possible to make the pressure distribution in the molds as simple uniform state, thereby providing the advantage in which the control target temperature value at the time of cooling can be easily selected.

Additionally, the injection molding method described above is preferable in a case where the resin viscosity is an amorphous resin having a high viscosity of $1\times10^3$ Pa·S or higher.

Unlike the crystalline resin, the viscosity does not change rapidly with the temperature in the high viscosity amorphous resin having the viscosity of $1\times10^3$ Pa·S or higher. However, because of its high viscosity, rapid pressure loss occurs at the thin-walled section at the time of flowing, and hence, the pressure propagation property deteriorates. For this reason, by setting the mold temperature at a temperature equal to or more than the flowing starting temperature at which the resin can maintain the sufficient flowing state, the flowing state of the resin can be maintained. By maintaining the pressure propagation in a favorable state, it is possible to make the pressure distribution in the molds as simple uniform state, thereby providing the advantage in which the control target temperature value at the time of cooling can be easily selected.

The above described injection molding method is an injection molding method provided with: an injection molding unit having at least one mold internal pressure sensor that can measure a resin pressure in a cavity of the mold, a mold having at least one temperature sensor that can measure a temperature in the vicinity of the cavity, an injection device that fills a molten resin into the mold by forward movement of an injection plunger or a screw, an input device that can input a value of mold internal pressure in a predetermined cavity, and an injection pressure control device that controls an injection pressure, which is a forward movement pressure of the injection plunger or the screw, such that a pressure value measured by the pressure sensor becomes the value of mold internal pressure input by the input device; a mold heating-cooling device that can supply both a heating medium for heating the mold and a cooling medium for cooling the mold; and a valve for switching the heating medium and the cooling medium. The injection mold method includes: supplying the heating medium and the cooling medium to a common fluid passage by switching of the valve; and manufacturing a molded item by operating the injection molding unit while controlling the temperature of the mold. In the injection molding method, it is better to include the following: heating and raising the temperature of the mold by starting the supplying of the heating medium before the injection device injects the molten resin into the mold; completing the supplying of the heating medium at a point in time when a mold temperature measured by the temperature sensor provided in the vicinity of the cavity reaches a predetermined heating target temperature and when time is up in a timer that starts at the beginning of the heating of the mold; while starting filling of the molten resin into the mold by the injection device during the heating or after the heating of the mold; controlling the injection pressure of the injection plunger or screw such that the mold internal pressure measured by the pressure sensor becomes the value of the mold internal pressure input by the input device in the filling process; starting supplying of the cooling medium to lower the temperature of the mold during the filling or after the filling of the filling process and completing the supplying of the cooling medium at a point in time when the mold temperature measured by the temperature sensor provided in the vicinity of the cavity reaches a predetermined cooling target temperature and time is up in a timer that starts at the beginning of cooling the mold.

Further, in the injection molding method described above, it is favorable that the timing of starting supplying of the cooling medium is set by selecting at least one timing from among: the point in time when the supplying of the heating medium is completed or when the timer which starts counting at the completion of the supplying of the heating medium counts up; the point in time when the injection plunger or the screw reaches a predetermined position; and the point in time when a pressure at a predetermined position of the cavity reaches a predetermined value of pressure set in advance.

With the injection molding method, since the resin in the mold can be kept at a molten state during the filling regardless of the wall thickness distribution of the molded item, the narrowing of the effective fluid passage due to the growth of the skin layer (solidified layer on the surface of the molded item) with the cooling can be avoided, the pressure distribution of the resin in the mold becomes simple, and the pressure distribution with high reproducibility can be obtained. Therefore, the range of the appropriate position for the mold internal sensor becomes wider, whereby the position for attaching the mold internal pressure sensor can be easily determined In particular, this is effective in a mold having locally-thin-walled section in which the flowing pressure loss is large. Further, when plural mold temperature sensors are provided, it is possible to confirm if there is unevenness between the temperatures within the mold, such as existence or non existence of a portion where temperature does not reach the predetermined temperature. When the temperature is lower at a portion that affects the pressure loss of the resin flowing, such a portion is selected and is defined as a criterion, whereby the mold heating process can be controlled on the basis of the criterion.

Additionally, with the injection molding device shown in FIG. 20, the regenerated electric-power occurs during the deceleration of the injection operation (forward movement operation of the injection screw) or during the deceleration of the plasticizing operation (rotation operation of the injection screw). Since high reproducibility concerning the flowing state of the resin in the mold can be obtained by the mold internal pressure waveform control, variation in the regenerated electric-power for each shot can be suppressed. By supplying the regenerated electric-power as the electric power used in the heating- and cooling-medium supplying device having a large energy consumption, the energy consumed for the molding can be stably reduced.

Additionally, the injection molding method described above is effective for the crystalline resin in which crystallization of the resin occurs and whose pressure propagation rapidly decreases due to the temperature decrease, and the high-viscosity amorphous resin whose pressure loss of the flowing is large. Furthermore, by forcibly cooling the mold during the filling or after the filling, high-cycle molding process can be performed. Yet further, by controlling the mold internal pressure, it is possible to switch the resin pressure before the resin becomes solidified, and to satisfactorily propagate the resulting pressure to the resin in the mold, whereby the feedback control of the mold internal pressure becomes easy.

As for the temperature control during the injection molding cycle according to the present invention, it is not intended to limit a configuration of each part in the mold heating circuit and a molding procedure to those illustrated above, and the configuration and the molding procedure are allowed to be modified as needed. In addition, the use of the configurations described in the above-described embodiment can be done by will or choice, and modifications of the configurations into other configuration as appropriate are possible, without departing from the intention of the present invention.

EXPLANATION OF REFERENCE

1 injection molding device
2 movable mold
2a, 3a thermal-medium fluid passage
2b fluid passage
3 fixed mold
4 cavity
5 injection unit (injection section)
9 injection screw
7 unit body
18 screw-movement-amount sensor
19 mold internal pressure sensor
20 control device
25 temperature adjustment unit
28 mold internal resin temperature sensor
50 image display unit (display unit)
65 timer
81, 91, 101, 111, 121, 131, 132 first correlation diagram
82 second correlation diagram
83 third correlation diagram
84 fourth correlation diagram
85 fifth correlation diagram
86 sixth correlation diagram
88 eighth correlation diagram
A beginning of filling
B injection speed switching (changing) time
C beginning of pressure keeping
D completing of pressure keeping
F1, F2 temperature waveform
Ph injection pressure
St screw position
t time
M mold temperature
v injection speed

The invention claimed is:

1. An injection molding device, comprising:
   a mold having a cavity;
   an injection section, that has an injection screw displaceably configured to fill a molten resin into the cavity by the forward movement, and that performs a plurality of injection operations including at least a filling operation and a pressure keeping operation by displacing the injection screw;
   a position sensor that detects a screw position which is a position of the injection screw;
   a temperature sensor that can measure a temperature in the vicinity of the cavity of the mold;
   a temperature adjustment section that can adjust a mold temperature by heating or cooling the mold;

a control section that controls a displacement of the injection screw and the mold temperature, and determines a plurality of switching timings including a beginning of injection and a change in injection speed during injection process in the injection operations on the basis of the screw position; and, a display unit that displays an image on the basis of a command from the control section; wherein the control section creates a waveform diagram of the temperature in the vicinity of the cavity on the basis of input from the temperature sensor so as to correspond to a predetermined variation, and has the display unit display a first correlation diagram showing at least the change in injection speed of the determined plurality of switching timings during the injection process of the injection operations in the waveform diagram of the temperature.

2. The injection molding device according to claim 1, wherein
the temperature adjustment section heats the mold by supplying a heating medium to the mold, and cools the mold by supplying a cooling medium to the mold.

3. The injection molding device according to claim 1, wherein
the control section performs a heating-before-filling that heats the mold until the mold temperature becomes a predetermined temperature before the filling operation, and creates the waveform diagram of the temperature from one heating-before-filling to the next heating-before-filing.

4. The injection molding device according to claim 1, wherein
the plurality of switching timings include a beginning of injection, a change in injection speed, a beginning of pressure keeping, and a completion of pressure keeping.

5. The injection molding device according to claim 1, further comprising a timer, wherein
the predetermined variation is time.

6. The injection molding device according to claim 5, further comprising
an injection speed measurement section that measures an injection speed, which is an advanced speed of the injection screw, wherein
the control section creates a second correlation diagram, which shows a correlation between a measured value of the injection speed and time corresponding to a transition of the measured value of the injection speed, on the same timescale as the first correlation diagram, and displays the second correlation diagram on the display unit so as to be laid out with the first correlation diagram.

7. The injection molding device according to claim 5, further comprising
a pressure sensor that measures an injection pressure, which is an advancement pressure of the injection screw, wherein
the control section creates a third correlation diagram, which relates to a measured value of the injection pressure and time corresponding to a transition of the measured value of the injection pressure, on the same timescale as the first correlation diagram, and displays the third correlation diagram on the display unit so as to be laid out with the first correlation diagram.

8. The injection molding device according to claim 5, wherein
the control section creates a fourth correlation diagram, which relates to a measured value of the screw position and time corresponding to a transition of the measured value of the screw position, on the same timescale as the first correlation diagram, and displays the fourth correlation diagram on the display unit so as to be laid out with the first correlation diagram.

9. The injection molding device according to claim 1, wherein
the predetermined variation is the screw position.

10. The injection molding device according to claim 9, further comprising:
injection speed measurement devise for measuring an injection speed, which is an advanced speed of the injection screw, wherein
the control section creates a fifth correlation diagram, which shows a correlation between a measured value of the injection speed and a transition of the screw position, on the same injection-screw position scale as the first correlation diagram, and displays the fifth correlation diagram on the display unit so as to be laid out with the first correlation diagram.

11. The injection molding device according to claim 9, further comprising: a pressure sensor that measures an injection pressure, which is an advancement pressure of the injection screw, wherein
the control section creates a sixth correlation diagram, which relates to a measured value of the injection pressure and a transition of the screw position, on the same injection-screw position scale as the first correlation diagram, and displays the sixth correlation diagram on the display unit so as to be laid out with the first correlation diagram.

12. The injection molding device according to claim 1, wherein
the control section displays a measured value of the temperature in the vicinity of the cavity at one or more switching timings among the switching timings.

13. The injection molding device according to claim 1, wherein
the control section corrects the waveform diagram of the temperature on the basis of a correction value obtained beforehand on the basis of a positional relativity between a position of the temperature sensor and the cavity, and displays it.

14. The injection molding device according to claim 1, wherein
the control section displays information concerning a control process setting of the mold temperature so as to be laid out with the first correlation diagram.

15. The injection molding device according to claim 1, further comprising
a plurality of temperature sensors, wherein
the control section creates a plurality of first correlation diagrams based on input from the respective temperature sensors, and displays them on the display unit.

16. The injection molding device according to claim 15, wherein
the control section superimposes the plurality of first correlation diagrams, and displays the superimposed diagrams.

17. The injection molding device according to claim 15, wherein
the control section displays the plurality of first correlation diagrams in a selectable manner.

18. An injection molding method, comprising:
filling a molten resin into a cavity of a mold by a forward movement of an injection screw;

performing a plurality of injection operations including at least a filling operation and a pressure keeping operation by displacing the injection screw;

detecting a screw position of the injection screw with a position sensor;

measuring a temperature in the vicinity of the cavity of the mold;

adjusting a mold temperature by heating or cooling the mold;

controlling a displacement of the injection screw and the mold temperature;

determining a plurality of switching timings including a beginning of injections and a change in injection speed during injection process in the injection operations on the basis of the screw position; and displaying on a display unit a waveform diagram of the temperature in the vicinity of the cavity on the basis of input from the temperature sensor so as to correspond to a predetermined variation and a first correlation diagram showing the determined plurality of switching timings during the injection process of the injection operations in the waveform diagram of the temperature.

* * * * *